(12) United States Patent
Vanderzwet et al.

(10) Patent No.: US 11,471,932 B2
(45) Date of Patent: Oct. 18, 2022

(54) RIVET DISPENSING SYSTEMS AND METHODS OF USE THEREOF

(71) Applicants: HOWMET AEROSPACE INC., Pittsburgh, PA (US); CenterLine (Windsor) Limited, Windsor (CA)

(72) Inventors: Daniel Peter Vanderzwet, Omemee (CA); Simon Maurice Britton, Windsor (CA); Larry Frank Koscielski, LaSalle (CA); Eric Jean Michaud, Amherstburg (CA); David Mario Simone, Amherstburg (CA); Donald J. Spinella, Greensburg, PA (US); Gino N. Iasella, Pittsburgh, PA (US); Daniel Bergstrom, Sarver, PA (US); Robert B. Wilcox, McGregor, TX (US); Thomas R. Kingsbury, Waco, TX (US); Graham Scott Musgrove, Waco, TX (US)

(73) Assignees: HOWMET AEROSPACE INC., Pittsburgh, PA (US); CenterLine (Windsor) Limited, Windsor (CA)

( * ) Notice: Subject to any disclaimer, the term of this patent is extended or adjusted under 35 U.S.C. 154(b) by 0 days.

(21) Appl. No.: 17/295,238

(22) PCT Filed: Dec. 13, 2019

(86) PCT No.: PCT/US2019/066133
§ 371 (c)(1),
(2) Date: May 19, 2021

(87) PCT Pub. No.: WO2020/123896
PCT Pub. Date: Jun. 18, 2020

(65) Prior Publication Data
US 2021/0394252 A1    Dec. 23, 2021

Related U.S. Application Data

(60) Provisional application No. 62/778,939, filed on Dec. 13, 2018.

(51) Int. Cl.
*B21J 15/32* (2006.01)
*B21J 15/08* (2006.01)
*B23K 11/11* (2006.01)

(52) U.S. Cl.
CPC .............. *B21J 15/08* (2013.01); *B21J 15/32* (2013.01); *B23K 11/11* (2013.01)

(58) Field of Classification Search
CPC ........... B21J 15/32; B21J 15/08; B23K 11/11; B23K 11/0066; B23K 11/115; B23K 11/36
See application file for complete search history.

(56) References Cited

U.S. PATENT DOCUMENTS

| 4,122,988 A | 10/1978 | Casutt |
| 4,205,547 A | 6/1980 | Yamasaka |

(Continued)

FOREIGN PATENT DOCUMENTS

| CN | 2873359 Y | 2/2007 |
| CN | 104162621 | 11/2014 |

(Continued)

OTHER PUBLICATIONS

International Search Report and Written Opinion of the International Search Authority for International Application No. PCT/US2019/066133 dated Apr. 16, 2020.

*Primary Examiner* — Sarang Afzali
*Assistant Examiner* — Darrell C Ford
(74) *Attorney, Agent, or Firm* — K&L Gates LLP

(57) ABSTRACT

Rivet dispenser systems and methods of use thereof are provided. In a non-limiting embodiment, the rivet dispenser system comprises a rivet receiving member defining a (Continued)

channel therein, and a seat member. The channel includes a curved region. The rivet receiving member comprises a first port and a second port. The first port communicates with the channel and is configured to receive rivets. The second port communicates with the channel and is configured to dispense rivets. The channel extends between the first port and the second port and is configured to transport rivets from the first port to the second port in a series arrangement and in a preselected orientation. The seat member communicates with the second port and is configured to selectively engage with a rivet holder of a resistance spot rivet welding apparatus and introduce a single rivet to the rivet holder at one time.

12 Claims, 29 Drawing Sheets

(56) References Cited

U.S. PATENT DOCUMENTS

| | | | | |
|---|---|---|---|---|
| 4,604,889 | A * | 8/1986 | Sukharevsky | B21J 15/105 227/112 |
| 5,964,393 | A * | 10/1999 | Feldpausch | B21J 15/32 227/135 |
| 6,692,213 | B1 * | 2/2004 | Butler | B21J 15/32 414/412 |
| 6,796,454 | B1 * | 9/2004 | Matthews | B21J 15/32 227/135 |
| 10,099,273 | B2 | 10/2018 | Craythorn et al. | |
| 2013/0019457 | A1 * | 1/2013 | Moeser | B21J 15/32 29/818 |
| 2013/0047425 | A1 * | 2/2013 | Kikuchi | B21J 15/14 29/809 |
| 2016/0354872 | A1 * | 12/2016 | Koscielski | B23K 11/0053 |
| 2017/0072454 | A1 * | 3/2017 | Wilcox | B23K 11/0053 |
| 2017/0316556 | A1 | 11/2017 | Spinella et al. | |

FOREIGN PATENT DOCUMENTS

| | | |
|---|---|---|
| CN | 207787600 U | 8/2018 |
| EP | 2671662 A1 | 12/2013 |
| JP | 9-24437 A | 1/1997 |
| KR | 20-0415450 Y1 | 5/2006 |
| WO | 2006/084847 A1 | 8/2006 |

* cited by examiner

RIVET DISPENSING SYSTEMS AND METHODS OF USE THEREOF

CROSS-REFERENCE

This application claims priority to U.S. Provisional Patent Application No. 62/778,939, filed on Dec. 13, 2018, the contents of which are hereby incorporated by reference into this specification.

FIELD OF USE

The present disclosure relates to rivet dispenser systems and methods of use thereof.

BACKGROUND

Current methods of fastening work pieces together can include the use of, for example, self-piercing rivets or flow drill rivets. Other methods of fastening can require automated feeding of rivets to a resistance spot rivet welding apparatus. There are challenges with feeding rivets to a resistance spot rivet welding system.

SUMMARY

In an aspect, a rivet dispenser system is provided. The rivet dispenser system comprises a rivet receiving member defining a channel therein, and a seat member. The channel includes a curved region. The rivet receiving member comprises a first port and a second port. The first port communicates with the channel and is configured to receive rivets. The second port communicates with the channel and is configured to dispense rivets. The channel extends between the first port and the second port and is configured to transport rivets from the first port to the second port in a series arrangement and in a preselected orientation. The seat member communicates with the second port and is configured to selectively engage with a rivet holder of a resistance spot rivet welding apparatus and introduce a single rivet to the rivet holder at one time.

In another aspect, a method for dispensing a rivet onto a rivet holder of a resistance spot rivet welding apparatus is provided. The method comprises receiving the rivet in a channel of a rivet dispenser system and storing the rivet on a seat member of the rivet dispenser system. The method comprises moving the rivet dispenser system along a path to align the seat member with the rivet holder and introducing the rivet stored on the seat member to the rivet holder.

It is understood that the inventions disclosed and described in this specification are not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

The features and advantages of the examples, and the manner of attaining them, will become more apparent, and the examples will be better understood, by reference to the following description taken in conjunction with the accompanying drawings, wherein.

Corresponding reference characters indicate corresponding parts throughout the several views. The exemplifications set out herein illustrate certain embodiments, in one form, and such exemplifications are not to be construed as limiting the scope of the appended claims in any manner.

DETAILED DESCRIPTION OF NON-LIMITING EMBODIMENTS

Figure 1A:
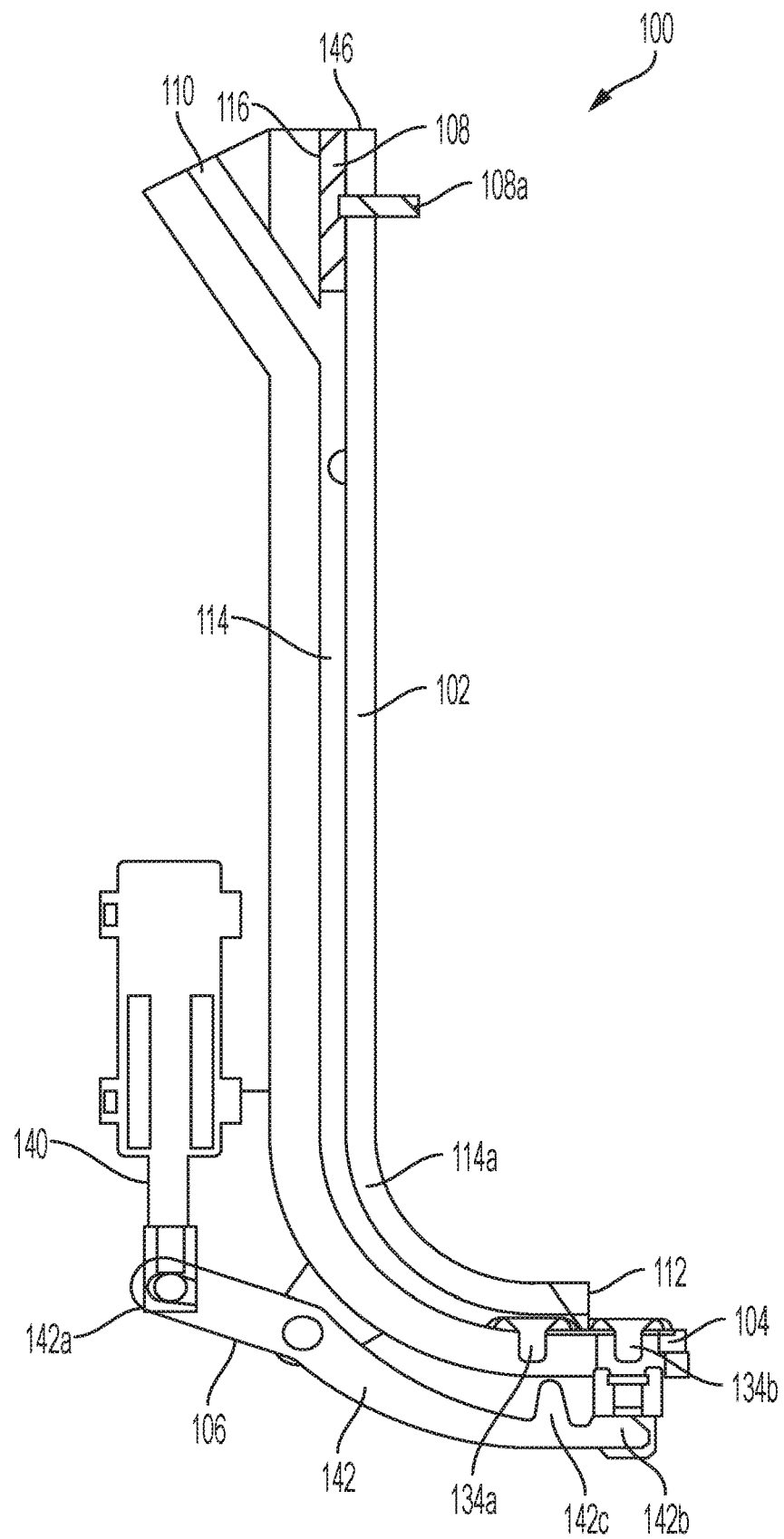
FIG. 1A is a right side cross-sectional view of a non-limiting embodiment of a rivet dispenser system according to the present disclosure and comprising a tensioner shown in a first configuration.

Various examples are described and illustrated herein to provide an overall understanding of the structure, function, and use of the disclosed apparatus, systems, and methods. The various examples described and illustrated herein are non-limiting and non-exhaustive. Thus, the invention is not limited by the description of the various non-limiting and non-exhaustive examples disclosed herein. Rather, the invention is defined solely by the claims. The features and characteristics illustrated and/or described in connection with various examples may be combined with the features and characteristics of other examples. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various embodiments disclosed and described in this specification can comprise, consist of, or consist essentially of the features and characteristics as variously described herein.

Any references herein to "various embodiments," "some embodiments," "one embodiment," "an embodiment," or like phrases means that a particular feature, structure, or characteristic described in connection with the example is included in at least one embodiment. Thus, appearances of the phrases "in various embodiments," "in some embodiments," "in one embodiment," "in an embodiment," or like phrases in the specification do not necessarily refer to the same embodiment. Furthermore, the particular described features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation. Such modifications and variations are intended to be included within the scope of the present embodiments.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural and the use of a plural noun includes the singular, unless the context of the usage requires otherwise.

As used herein, a referenced element or region that is "intermediate" two other elements or regions means that the referenced element/region is disposed between, but is not necessarily in contact with, the two other elements/regions. Accordingly, for example, a referenced element that is "intermediate" a first element and a second element may or may not be adjacent to or in contact with the first and/or second elements, and other elements may be disposed between the referenced element and the first and/or second elements.

Resistance Spot Rivet (RSR™) joining technology is a new resistance joining technology that can allow joining of a variety of part assemblies made from various combinations of materials. RSR™ joining technology employs rivets (e.g., metallic rivets) of various geometries and materials to offer a selection of solutions to match each joining scenario. Rivets can be applied to the joint using a modified resistance spot welding gun (e.g., transgun). The welding gun can be paired with a robotic manipulator and/or a pedestal welder and integrated into a system of auxiliary components. Each joint made using RSR™ joining technology typically consumes one rivet.

When a rivet is required for joining of parts, a rivet dispenser system according to the present disclosure can convey rivets to a location proximal to the location of installation of the rivet on the part assembly being joined.

Referring to FIGS. 1A-D, a rivet dispenser system 100 is provided. The rivet dispenser system 100 can comprise a rivet receiving member 102, a seat member 104, an actuation member 106, and a tensioner 108. The rivet receiving member 102 can be configured to include a channel 114 having a size and shape suitable to accommodate a predetermined number of rivets. In various non-limiting embodiments, the length of the channel 114 can accommodate a quantity of rivets suitable for a single production cycle using RSR™ joining technology. Therefore, the quantity of rivets in the channel 114 may only need to be replenished between production cycles, when the welding gun is being indexed, when parts are being loaded/unloaded, and/or during a welding electrode tip maintenance cycle.

The channel 114 defined by the rivet receiving member 102 comprises a first port 110 and a second port 112 communicating with the channel 114. The first port 110 can be configured to receive rivets, and the second port 112 can be configured to dispense rivets. The channel 114 can extend from the first port 110 to the second port 112 and can receive and/or store rivets, such as, for example rivet 134a and rivet 134b. In various non-limiting embodiments, the rivets 134a and 134b can comprise the same dimensions or different dimensions. In various non-limiting embodiments, the rivets 134a and 134b can comprise the same material or different materials.

The first port 110 can receive a rivet from a rivet source, such as, for example, a vibratory bowl or a rivet dispenser reloading system, and the second port 112 can dispense a rivet from the channel 114 to downstream position. The channel 114 can be configured to transport rivets between the first port 110 and the second port 112. The channel 114 can comprise, for example, a generally T-shaped cross-section suitable to receive and transport rivets having a generally T-shaped profile. For example, a top region of the T-shaped cross-section can be sized to accommodate a head portion of a rivet, and a transverse region of the T-shaped cross-section can be sized to accommodate a shank of the rivet.

In various other non-limiting embodiments, a cross-section of the channel 114 can be configured to accommodate a weld-stud and/or a weldnut. The cross-sectional shape and size of the channel 114 can inhibit, if not prevent, jamming of rivets disposed in the channel 114, shingling (e.g., overlapping of the head portions) of the rivets within the channel 114, and gaps between successive rivets within the channel 114. For example, the channel 114 can be configured to allow passage of rivets 134a and 134b from the first port 110, through the channel 114, and to the second port 112 in a series arrangement and in a preselected orientation.

The channel 114 can follow a generally J-shaped path, including a curved region 114a. The channel 114 of the rivet receiving member 102 can receive the rivets 134a and 134b through the first port 110 in a preselected orientation, and as the rivets 134a and 134b pass along the J-shaped path of the channel 114, they are re-oriented to assume an orientation suitable for presentation to a rivet holder of a resistance spot rivet welding apparatus (not shown in FIGS. 1A-D) as they pass out of the second port 112.

In certain non-limiting embodiments, pressurized gas can urge rivets 134a and 134b in series and in a preselected orientation along the first port 110, into and along the channel 114, and out through the second port 112. The pressurized gas can be introduced into the first port 110 and/or the channel 114. The pressurized gas can inhibit, if not prevent, jamming of rivets within the channel 114, shingling of rivets (e.g., overlapping head portions of rivets) within the channel 114, and gaps between successive rivets within the channel 114.

A tensioner 108 can move through a portion of the channel 114 and forcibly contact rivets within the channel 114 to thereby urge the rivets through the curved region 114a of the channel 114 toward the second port 112 and onto seat member 104. In various non-limiting embodiments, the tensioner 108 can comprise a protrusion 108a which to engage a rivet dispenser reloading system (not shown) adapted to reload the channel 114 with rivets. Upon engagement of the protrusion 108a with a rivet dispenser reloading system, the tensioner 108 can move into the secondary channel 116 and assume a first configuration shown in FIG. 1A. When the tensioner 108 is in the first configuration, additional rivets can pass into the channel 114 from the first port 110 and pass along the channel 114 toward the second port 112.

Figure 1B:
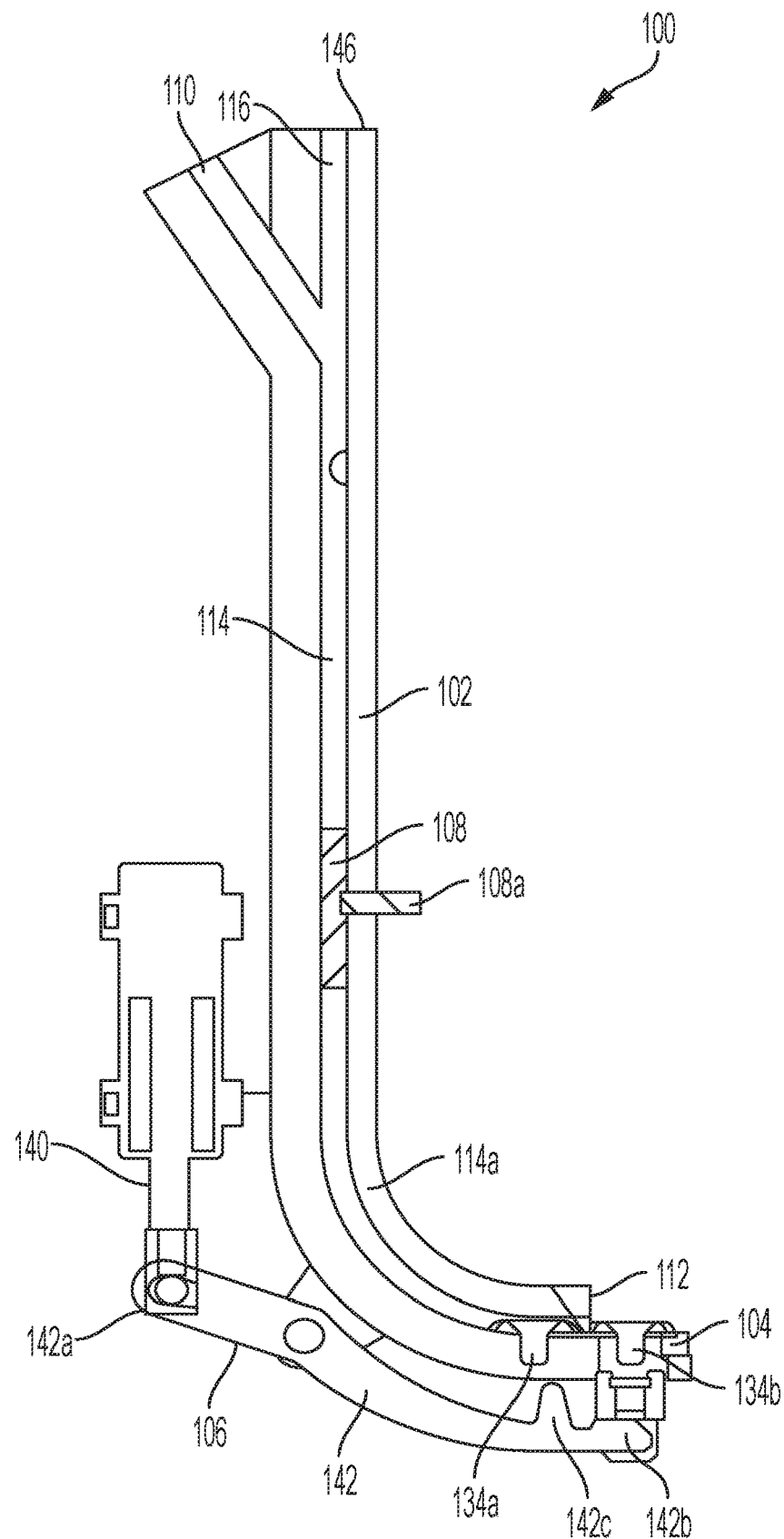
FIG. 1B is a right side cross-sectional view of the rivet dispenser system of FIG. 1A wherein the tensioner is shown in a second configuration.

Referring to FIG. 1B, upon disengagement with the rivet dispenser reloading system, the tensioner 108 can be released and move along the channel 114 to forcibly contact the rivets within the channel 114 to urge the rivets towards the seat member 104. The tensioner 108 can comprise at least one of a spring, a piston, an actuator, and a plunger.

Figure 6A:
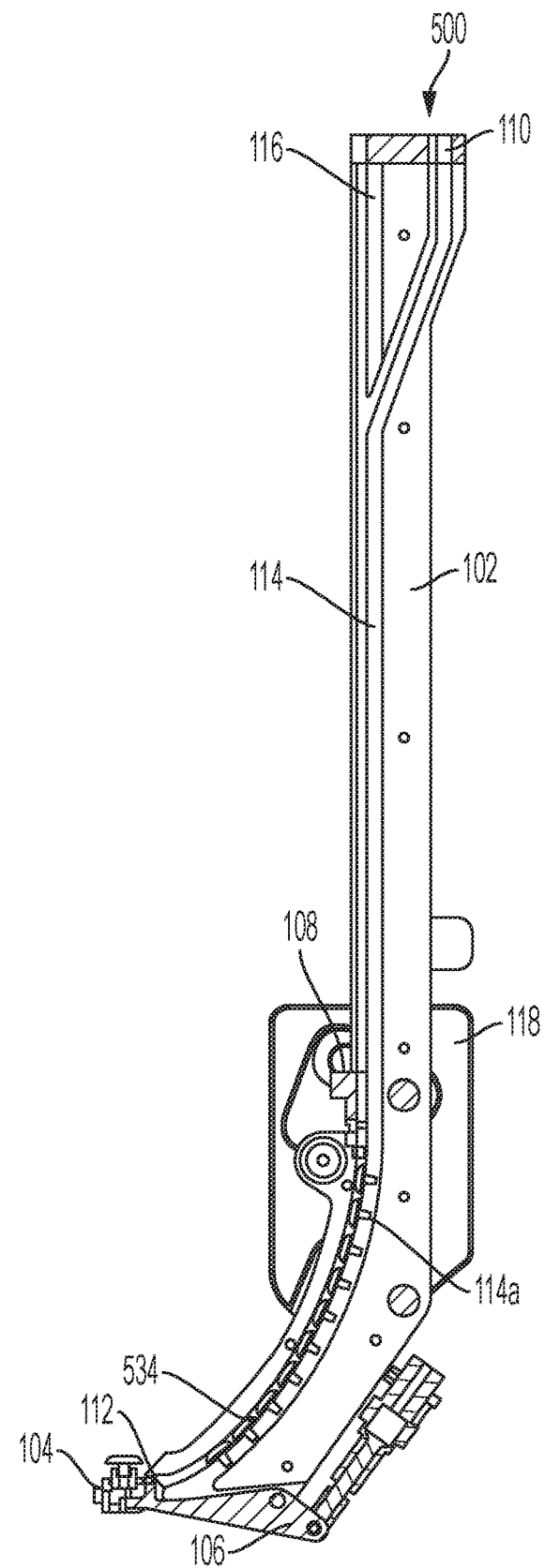
FIG. 6A is a left side cross-sectional elevational view of the rivet dispenser system of FIG. 5A taken along A-A in FIG. 5B wherein the system is shown in a rivet tension configuration in which the tensioner can urge rivets within the channel toward the seat member.
Figure 6B:
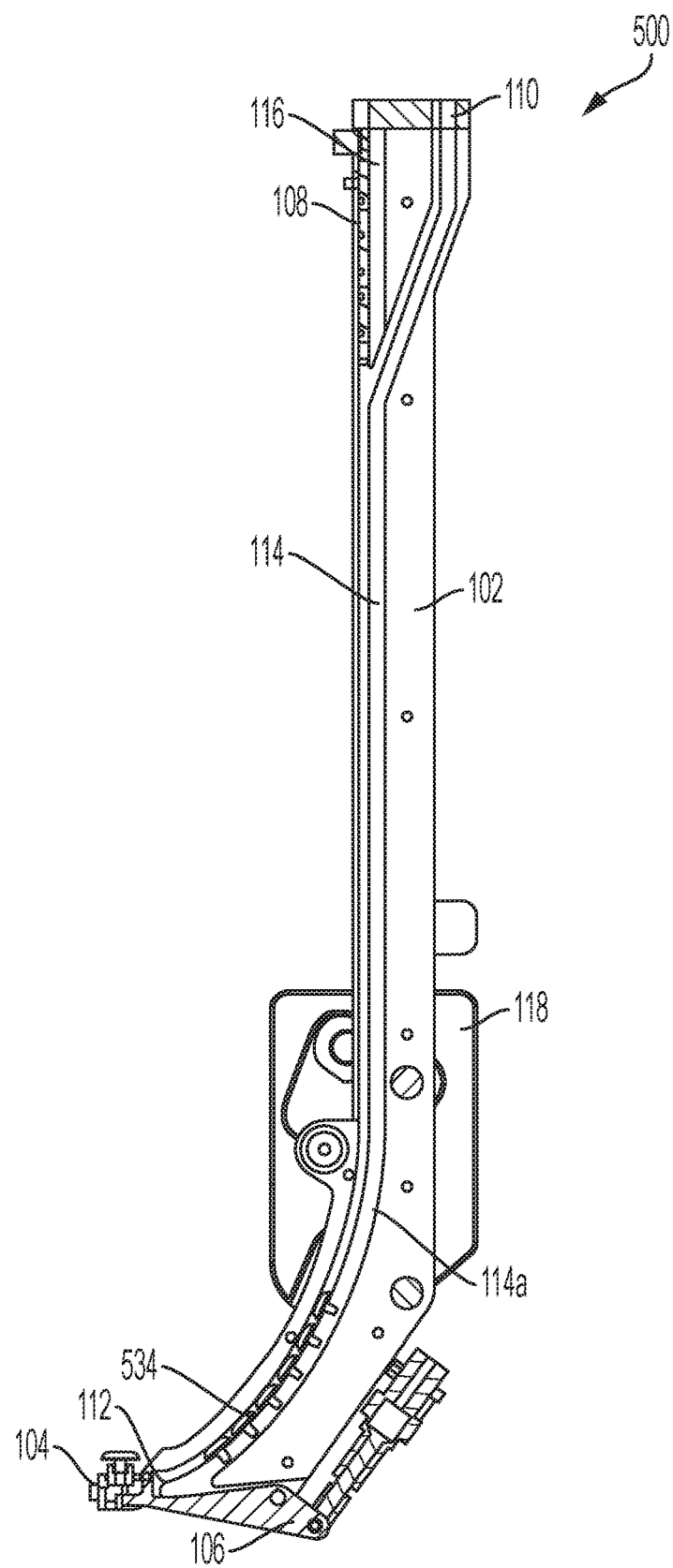
FIG. 6B is left side cross-sectional elevational view of the rivet dispenser system of FIG. 6A shown in a rivet reload ready configuration wherein the tensioner is in a secondary channel and the system is configured to receive rivets.
Figure 6C:
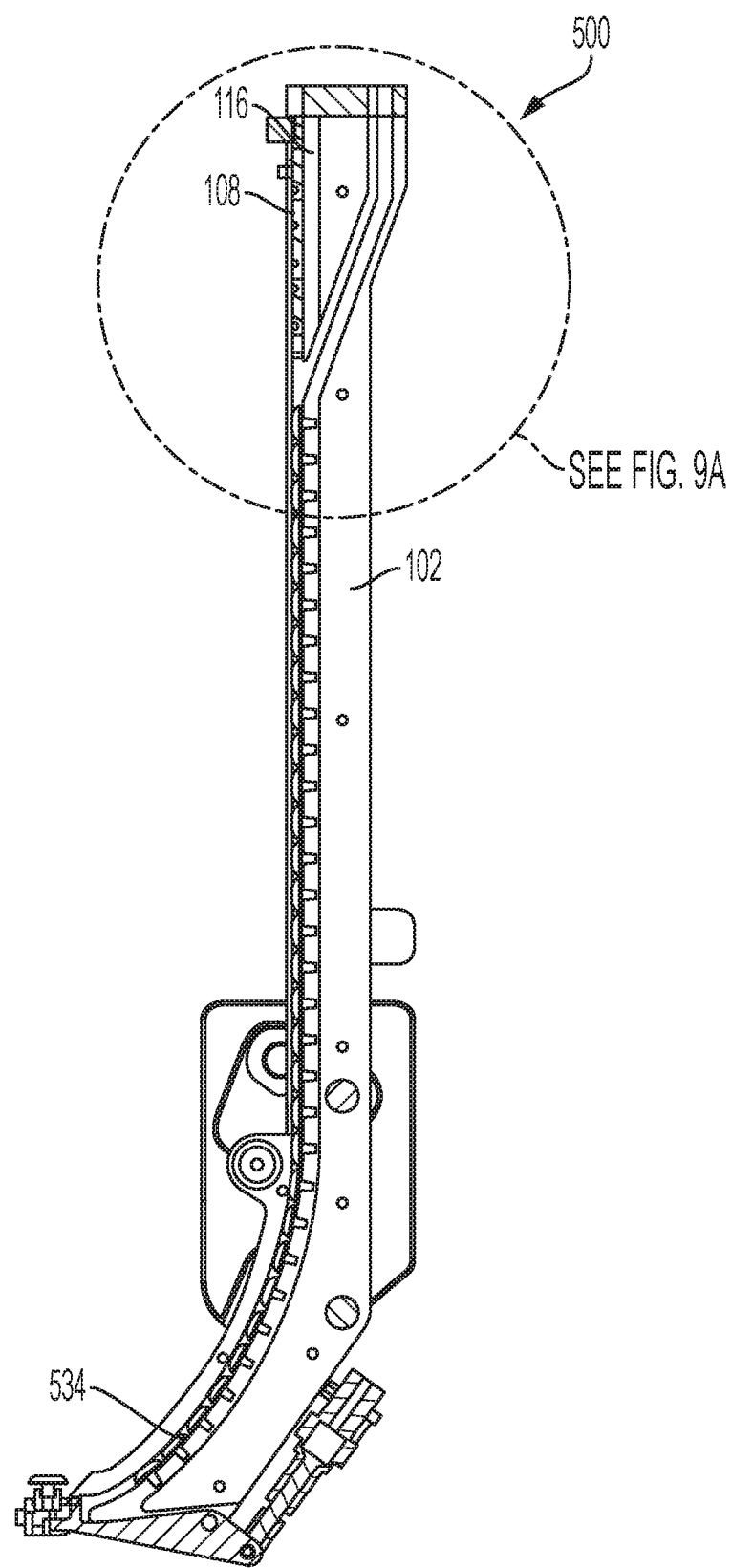
FIG. 6C is a left side cross-sectional elevational view of the rivet dispenser system of FIG. 6A shown in a reloaded configuration wherein the channel has been reloaded with rivets and the tensioner can urge the rivets within the channel toward the seat member.

In various non-limiting embodiments, a rivet dispenser system 500 is provided in FIGS. 5A-5F and 6A-6C. FIG. 6A illustrates the tensioner 108 of the rivet dispenser system 500 in a rivet tension configuration wherein the tensioner 108 can urge the rivets 534 within the channel 114 towards the seat member 104. As illustrated in FIG. 6B, the tensioner 108 can be moved into the secondary channel 116 to a rivet reload ready configuration in order to enable additional rivets to be received in the channel 114 from the first port 110. The tensioner 108 can be moved into the secondary channel 116 by a rivet reloading system and held in the secondary channel 116 until the desired number of rivets are added to the channel 114 through the first port 110. After the additional rivets have been added to the channel 114, the tensioner 108 can be released from the secondary channel 116, enter the channel 114, and forcibly contact the rivets 534 to urge the rivets 534 within the channel 114 toward the seat member 104.

Figure 9A:
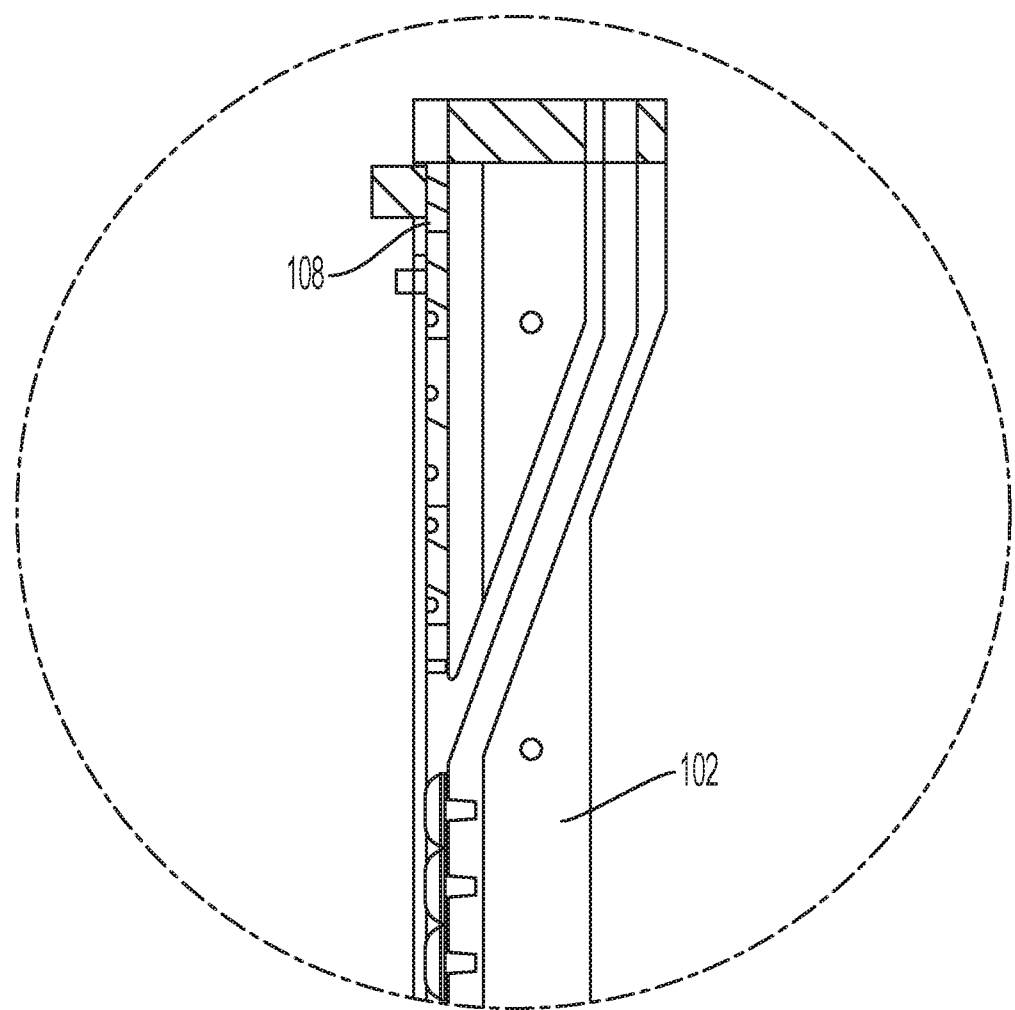
FIG. 9A is a detail view showing the tensioner of the rivet dispenser system of FIG. 6C.
Figure 9B:
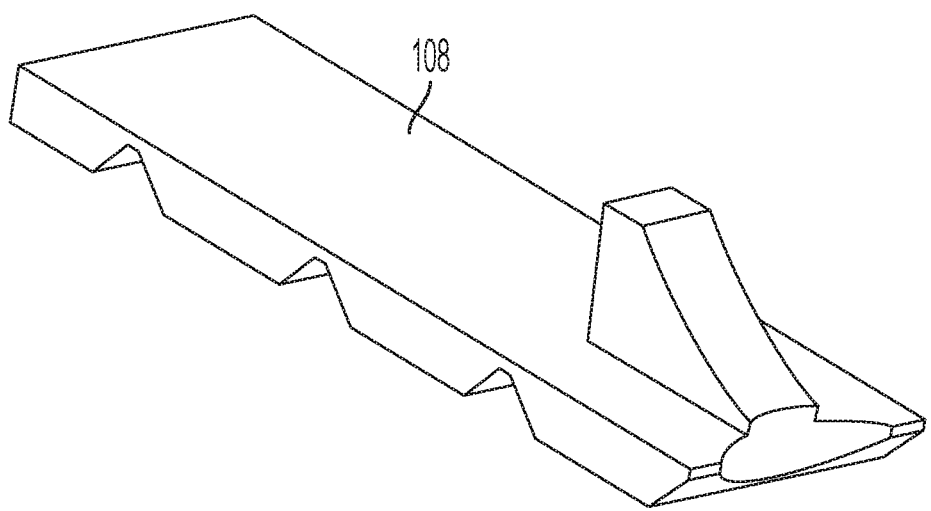
FIG. 9B is a perspective view of the tensioner of the rivet dispensing system of FIG. 6C shown in isolation.

Detailed views of the tensioner 108 are provided in FIGS. 9A-9B. As illustrated in those figures, the shape of the tensioner 108 can facilitate preventing rivets from entering the channel 116 so that rivets can smoothly transition from the first port 110 to the channel 114 at the "Y" shaped junction therebetween shown in the figures. The tensioner 108 can comprise a fin-like protrusion 108a with a thickness substantially equal to a shank diameter of the rivets 534, a height substantially equal to a shank length of the rivets 534, and follow the profile of the radius of the head of the rivets 534.

Figure 7C:
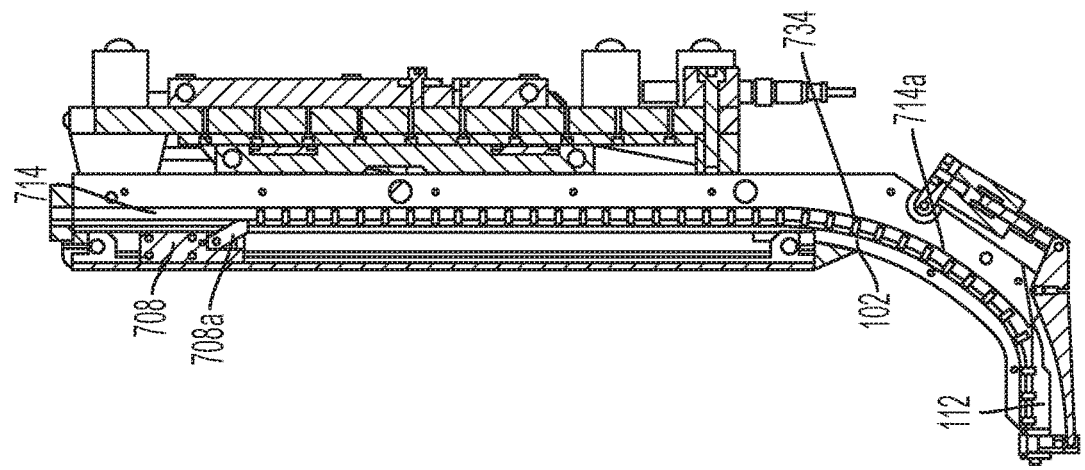
FIG. 7C is a side cross-sectional elevational view of the rivet dispenser system of FIG. 7B where the tensioner is in a third positioned and the finger has be redeployed into the channel.
Figure 7B:
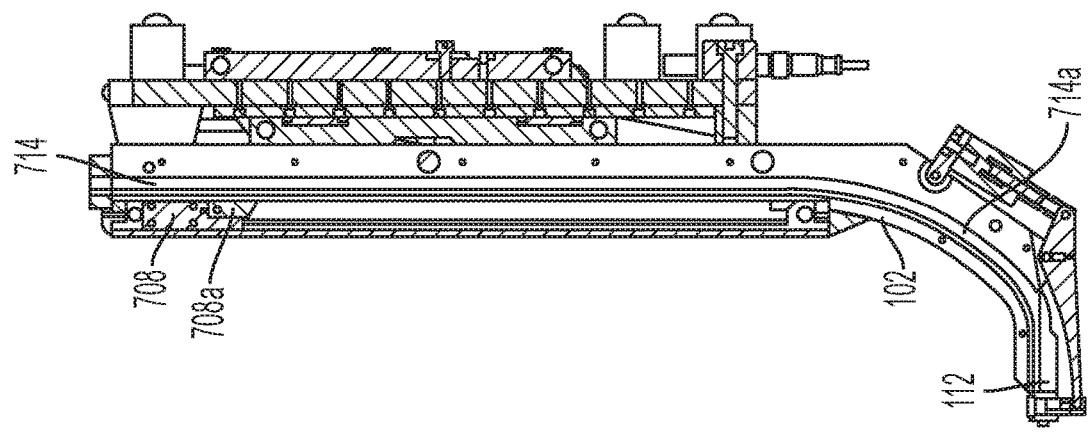
FIG. 7B is a side cross-sectional elevational view of the rivet dispenser system of FIG. 7A where the tensioner is in a second position and the finger is retracted from the channel.
Figure 7A:
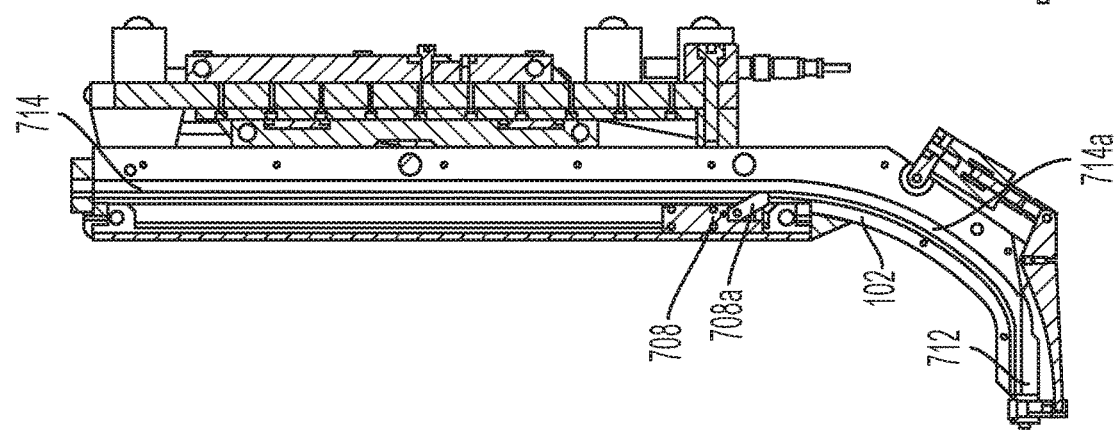
FIG. 7A is a side elevational cross-sectional view of a non-limiting embodiment of a rivet dispenser system comprising a tensioner in a first position, wherein a finger of the tensioner is deployed into a channel.
Figure 8A:
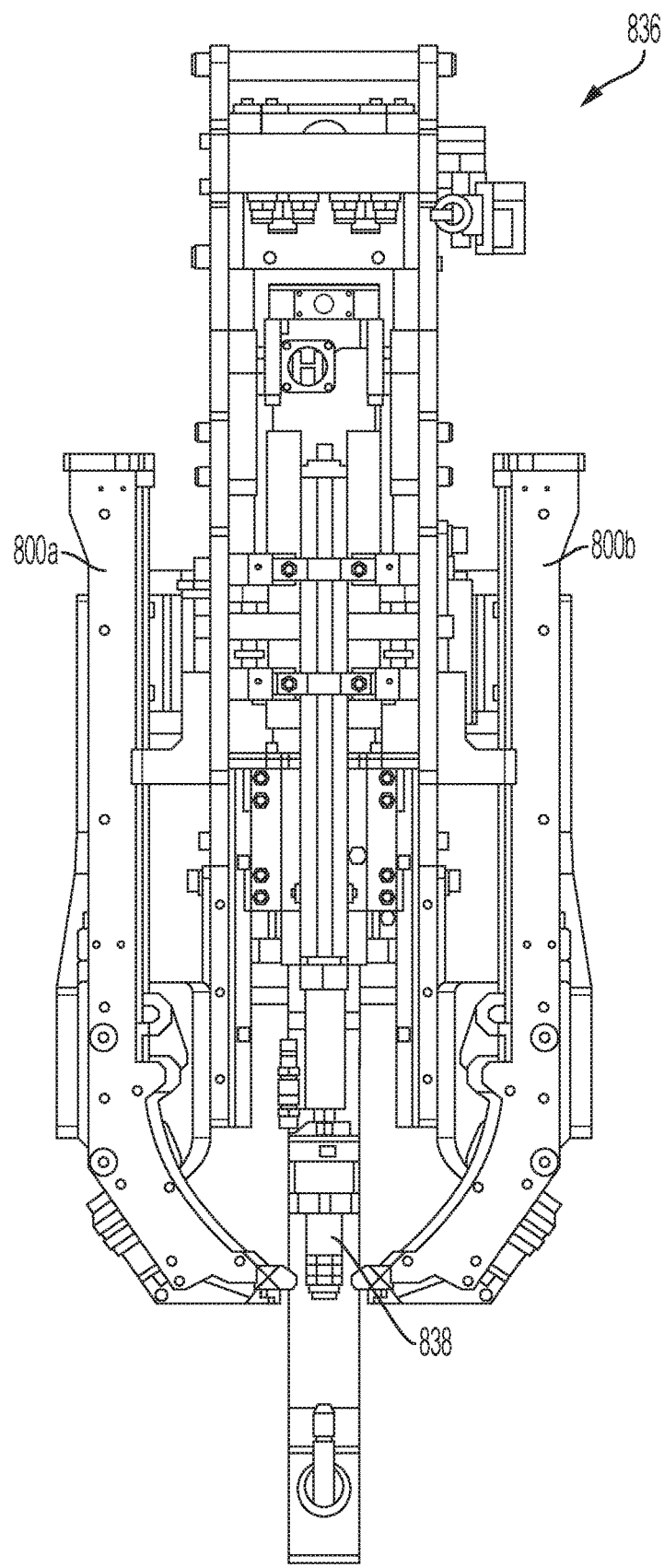
FIG. 8A is a front elevational view showing a non-limiting embodiment of a resistance spot rivet welding apparatus comprising two rivet dispenser systems (non-limiting embodiment) according to the present disclosure.
Figure 8B:
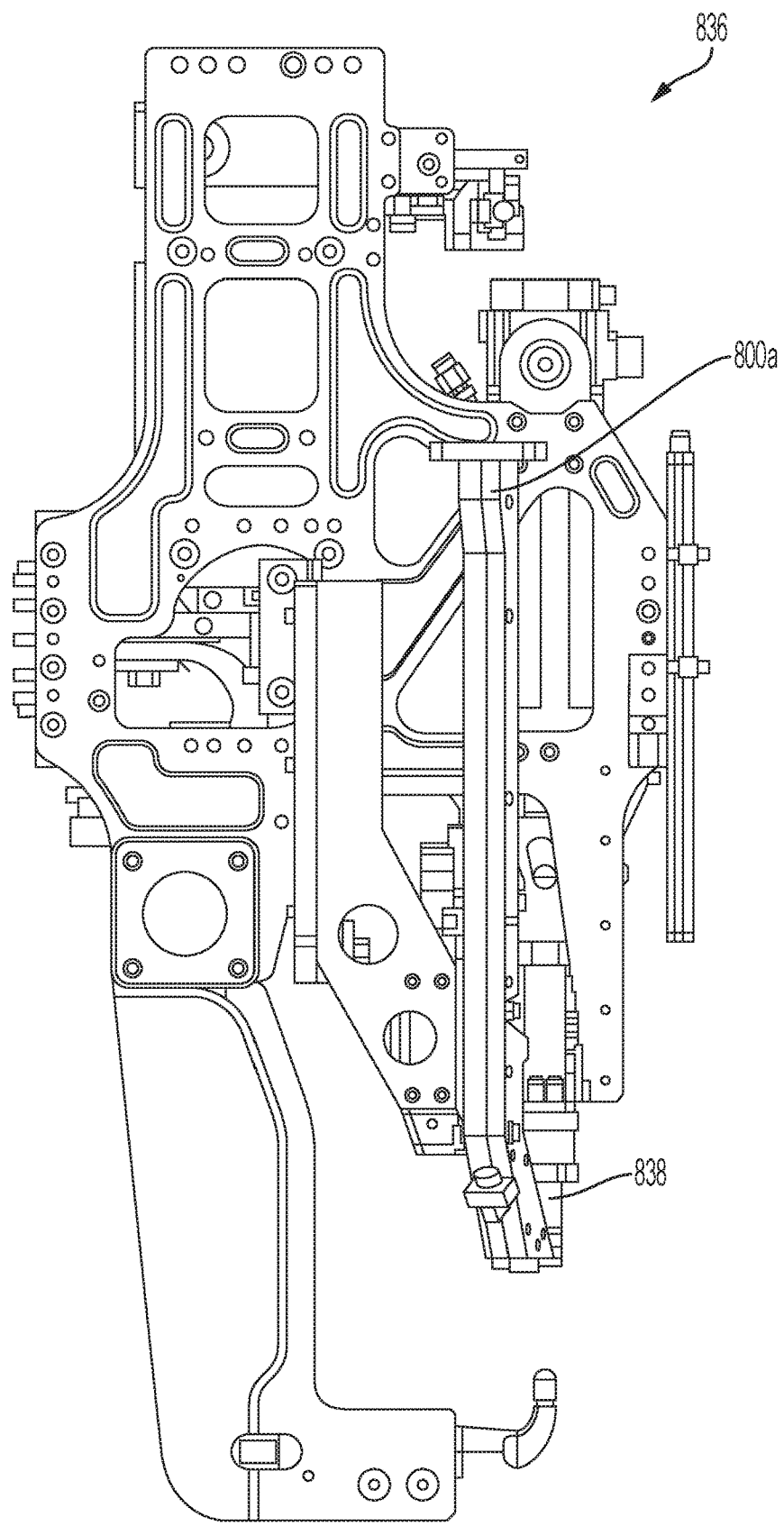
FIG. 8B is a left side elevational view of the resistance spot rivet welding apparatus of FIG. 8A.
Figure 8C:
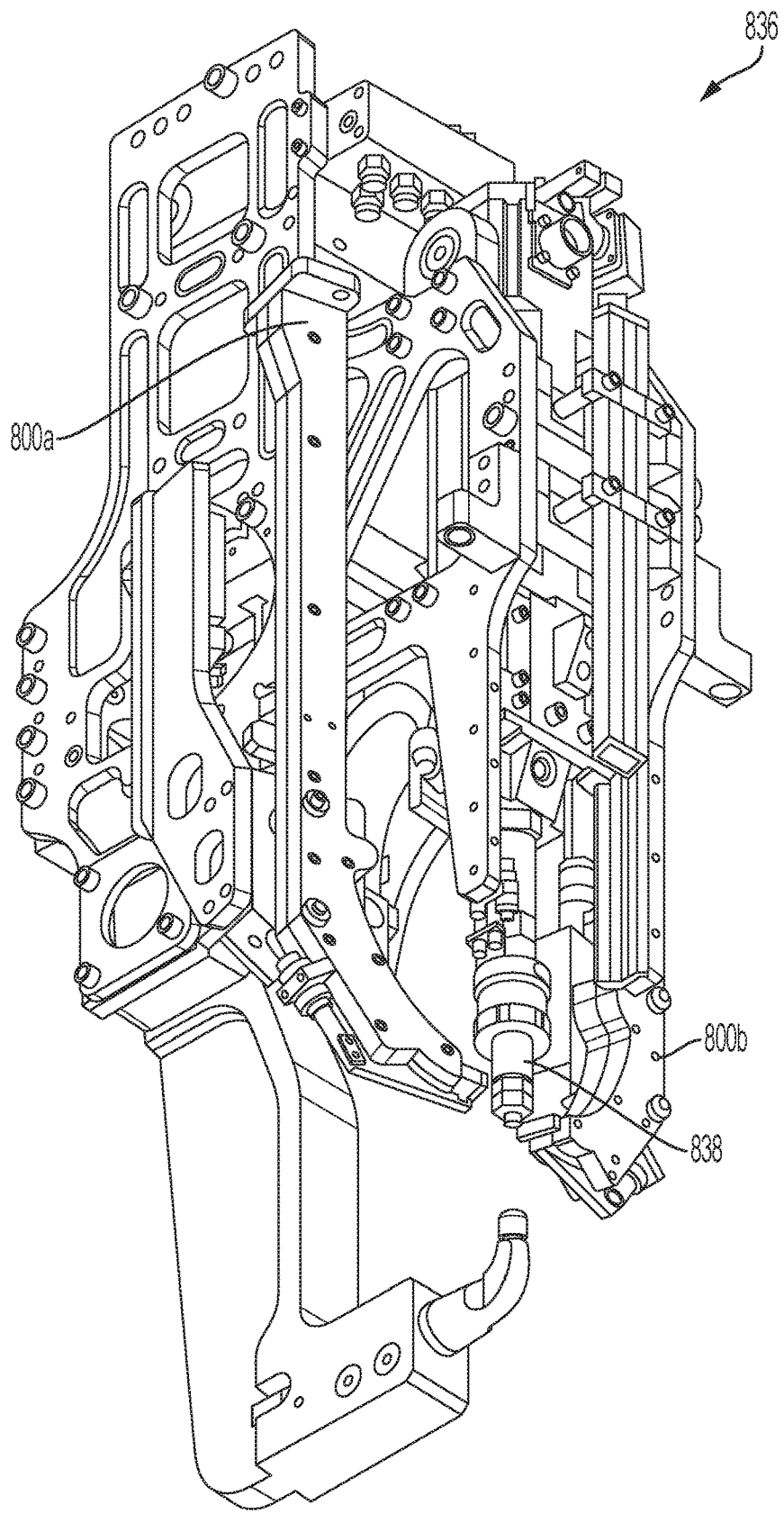
FIG. 8C is a bottom front perspective view of the resistance spot rivet welding apparatus of FIG. 8A.
Figure 8D:
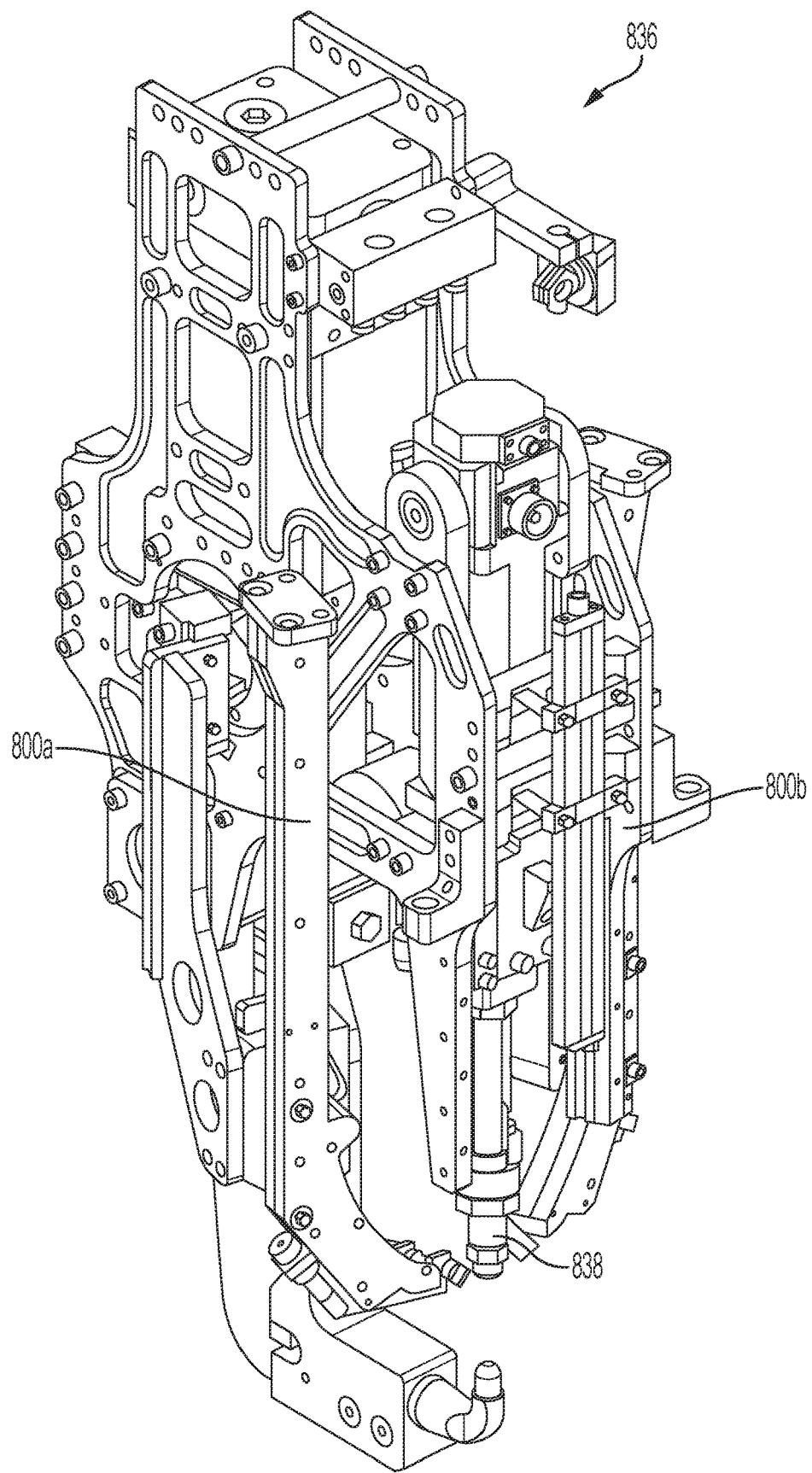
FIG. 8D is a top front perspective view of the resistance spot rivet welding apparatus of FIG. 8A.

FIGS. 7A-C show a non-limiting embodiment of a rivet dispenser system 700 comprising a tensioner 708, wherein the tensioner 708 is in a first position in a channel 714 of the rivet receiving member 102. The channel 714 can be a single, continuous, unbranched channel that extends from the first port 110 to the second port 112. The tensioner 708 can urge rivets 534 to traverse along a curved region 714a of the channel 714. The tensioner 708 can flex in the plane of the heads of the rivets 534 and be able to handle the compression load of a spring along a length of the tensioner 708. In various non-limiting embodiments, the tensioner 708 can comprise a rodless cylinder (e.g., an air cylinder). The rodless cylinder can move the tensioner 708 along the channel 714.

In various non-limiting embodiments, the tensioner 708 can comprise a finger 708b that can be deployed and extend into the channel 714 or can be retracted from the channel 714 and allow rivets to traverse along the channel 714 past the tensioner 708. The finger 708b can forcibly contact the rivets 734 when deployed into the channel 714 as illustrated in FIG. 7A. The finger 708b can retract as illustrated in FIG. 7B and the tensioner 708 can be moved to a second position in the channel 714 in order to add additional rivets to the channel 714. The additional rivets can traverse through the channel 714 past the tensioner 708 and toward the second port 112. Thereafter, the finger 708b can be re-deployed into the channel 714 and the tensioner 708 can be moved to a third position to forcibly contact the additional rivets. For example, the rodless cylinder can re-deploy the finger 708b and move the tensioner 708 into forcible contact with the additional rivets.

Figure 1C:
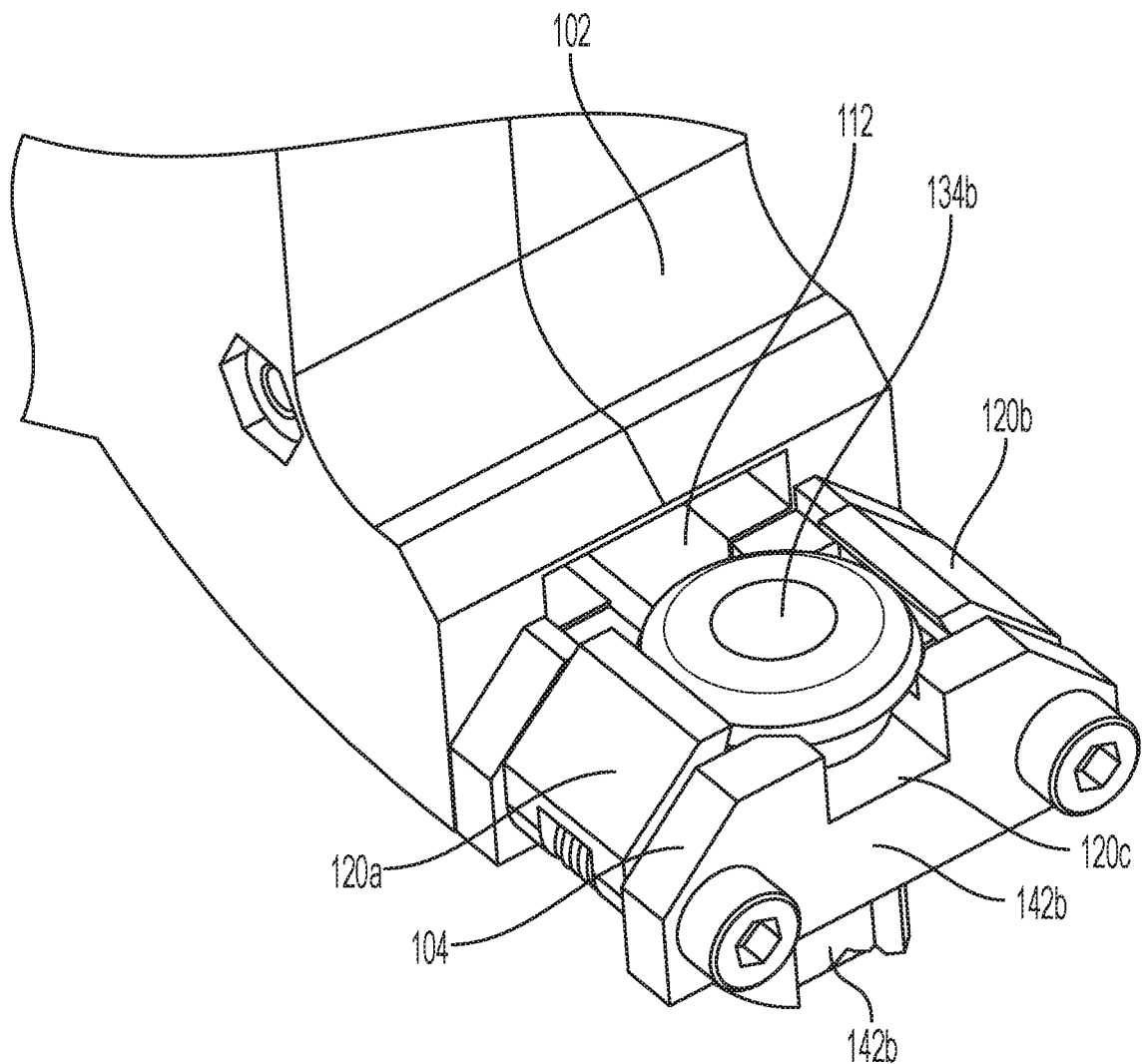
FIG. 1C is a perspective view of a seat member and a proximate region of the rivet dispenser system of FIG. 1A.
Figure 1D:
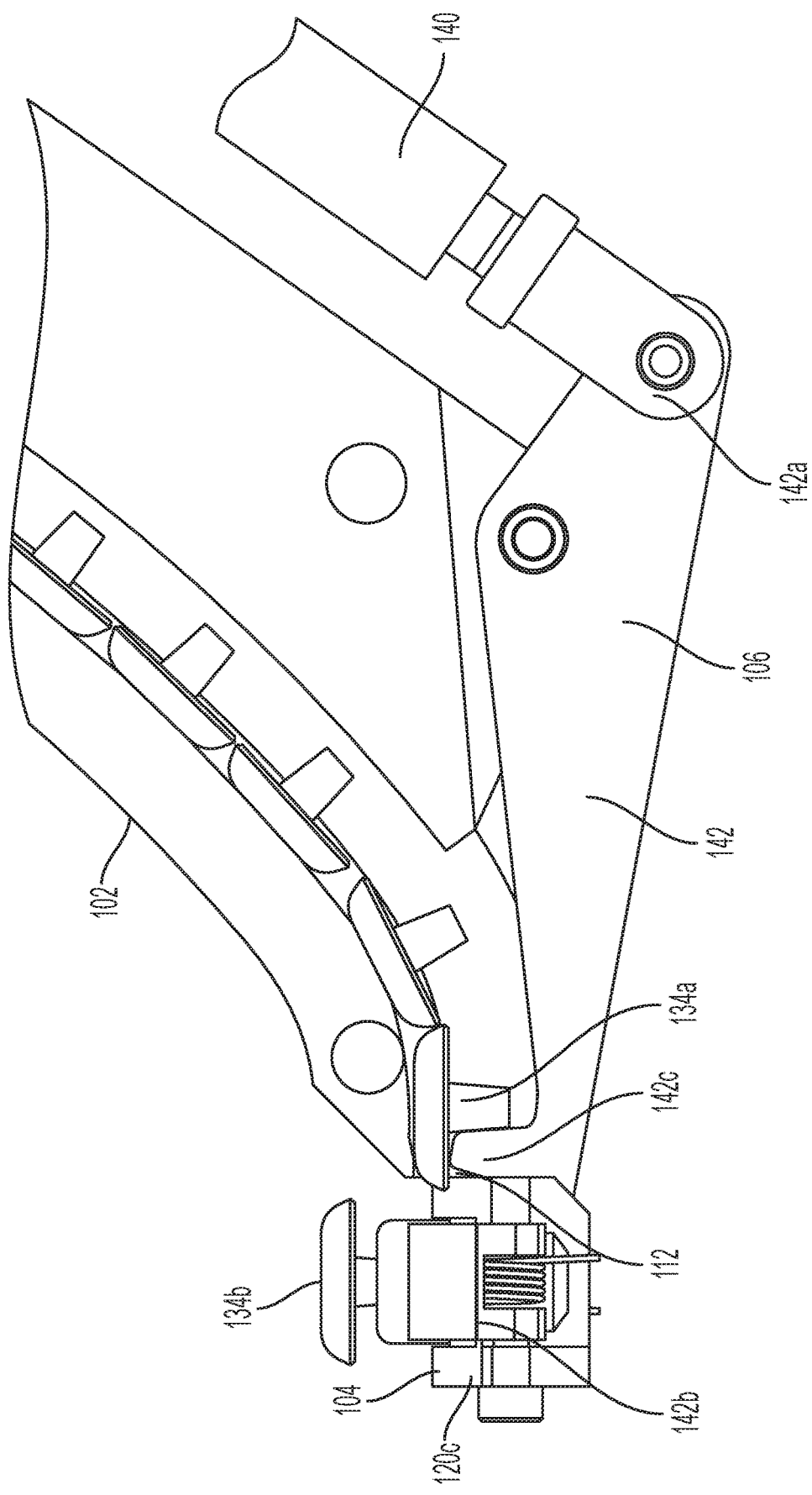
FIG. 1D is a left side view in partial cross section of a seat member and a proximate region of the rivet dispenser system of FIG. 1A.

Referring to FIGS. 1C-D, the seat member 104 can communicate with the second port 112 and can be configured to selectively engage with a rivet holder of a resistance spot rivet welding apparatus. The seat member 104 can receive a single rivet at one time from the second port 112. The seat member 104 can comprise a first jaw 120a, a second jaw 120b, and a block 120c that can be structured to receive the rivet from the second port 112 and maintain the rivet in a preselected position and orientation on the rivet dispenser system 100. A rivet holder of a resistance spot rivet welding apparatus (not shown in FIGS. 1A-D) can then remove the rivet from the seat member 104. As illustrated in FIG. 1C, the jaws 120a and 120b can be pivotally coupled to the block 120c and can be adapted to forcibly contact the rivet 134b when it is positioned on the seat member 104. The forcible contact can limit and/or prevent a rivet from changing position and/or orientation with respect to the seat member 104 during movement of the rivet dispenser system 100.

In various embodiments, the seat member 104 can comprise a grommet such that the rivet 134b is positioned intermediate the grommet and the jaws 120a and 120b when the rivet is in the preselected position. The single rivet captured in the jaws 120a and 120b can be transferred to the rivet holder.

The actuation member 106 can move the rivet independently of the seat member 104. For example, the actuation member 106 can comprise a lever 142 and an actuator or piston 140. The actuator or piston 140 can apply a force to a first end 142a of the lever 142 of the actuation member 106 to cause a second end 142b of the lever 142 to move from a first position to a second position, thereby engaging and moving the rivet 134b on the seat member 104 to a secondary position above the seat member 104 (as illustrated in FIG. 1D). When in the secondary position, the rivet 134b can be engaged by a rivet holder of a resistance spot rivet welding apparatus and removed from the seat member 104. Once the rivet holder has engaged the rivet 134b and removed it from the seat member 104, the rivet 134b does not return to the seat member 104 when the lever 142 returns to the first position. Thereafter, another rivet 134a can move onto the seat member 104 from the second port 112.

The lever 142 can comprise a protrusion 142c that can engage additional rivets and inhibit the additional rivets from advancing from the second port 112 onto the seat member 104. For example, when the second end 142b of the lever 142 is moved from the first position illustrated in FIGS. 1A-B to the second position illustrated in FIG. 1D, the protrusion 142c can forcibly contact and impede movement of the rivet 134a that is next in line to exit the second port 112 and enter the seat member 104, while moving the rivet 134b relative to the seat member 104.

In various non-limiting embodiments, referring to FIGS. 1A-1B, the rivet receiving member 102 can comprise a contact plate 146 suitable for engaging a rivet dispenser reloading system and/or facilitating alignment with a rivet dispenser reloading system.

Figure 2A:
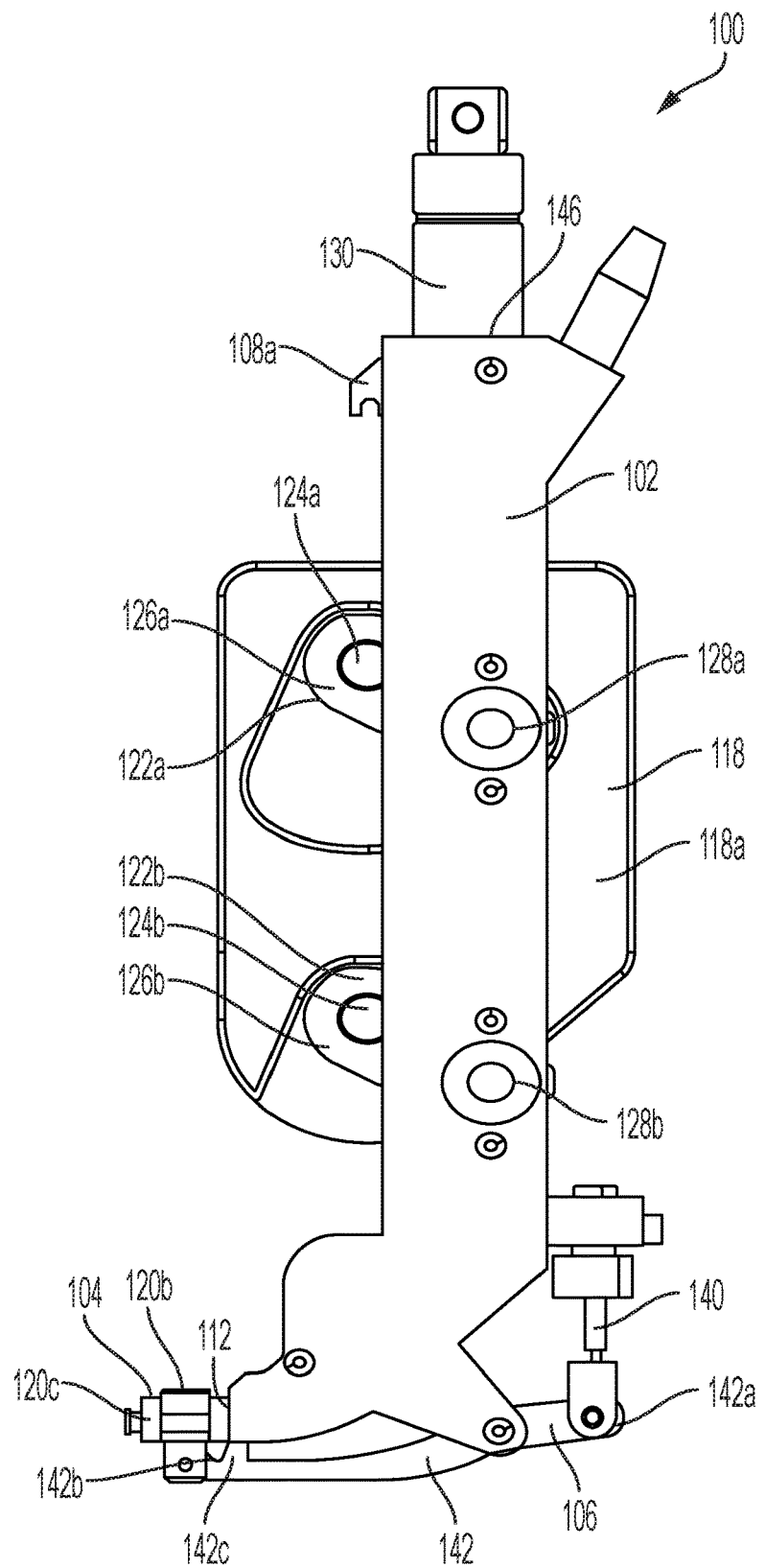
FIG. 2A is a left side elevational view of a non-limiting embodiment of a rivet dispenser system according to the present disclosure shown in a first configuration.
Figure 2B:
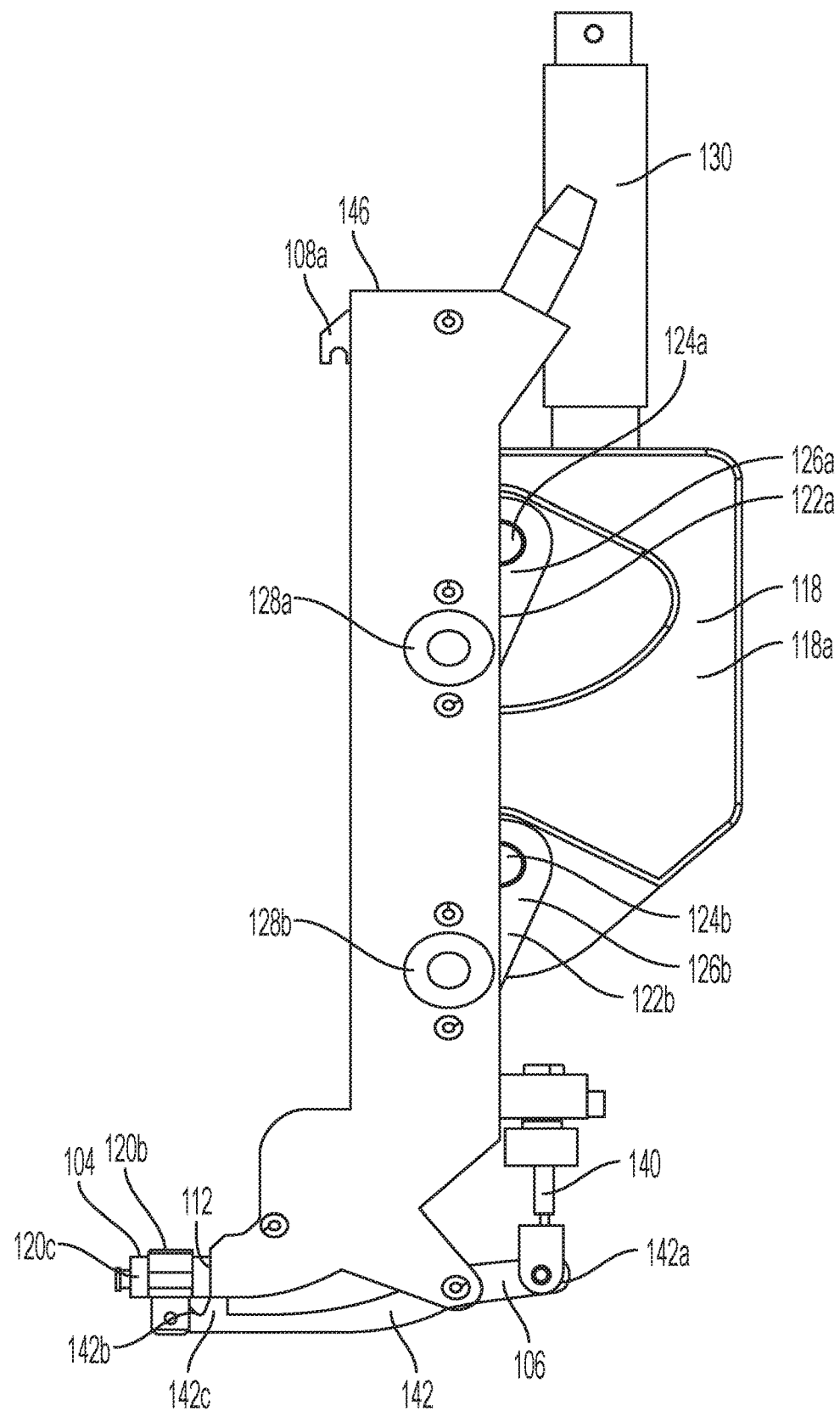
FIG. 2B is a left side elevational view of the rivet dispenser system of FIG. 2A shown in a second configuration.
Figure 2C:
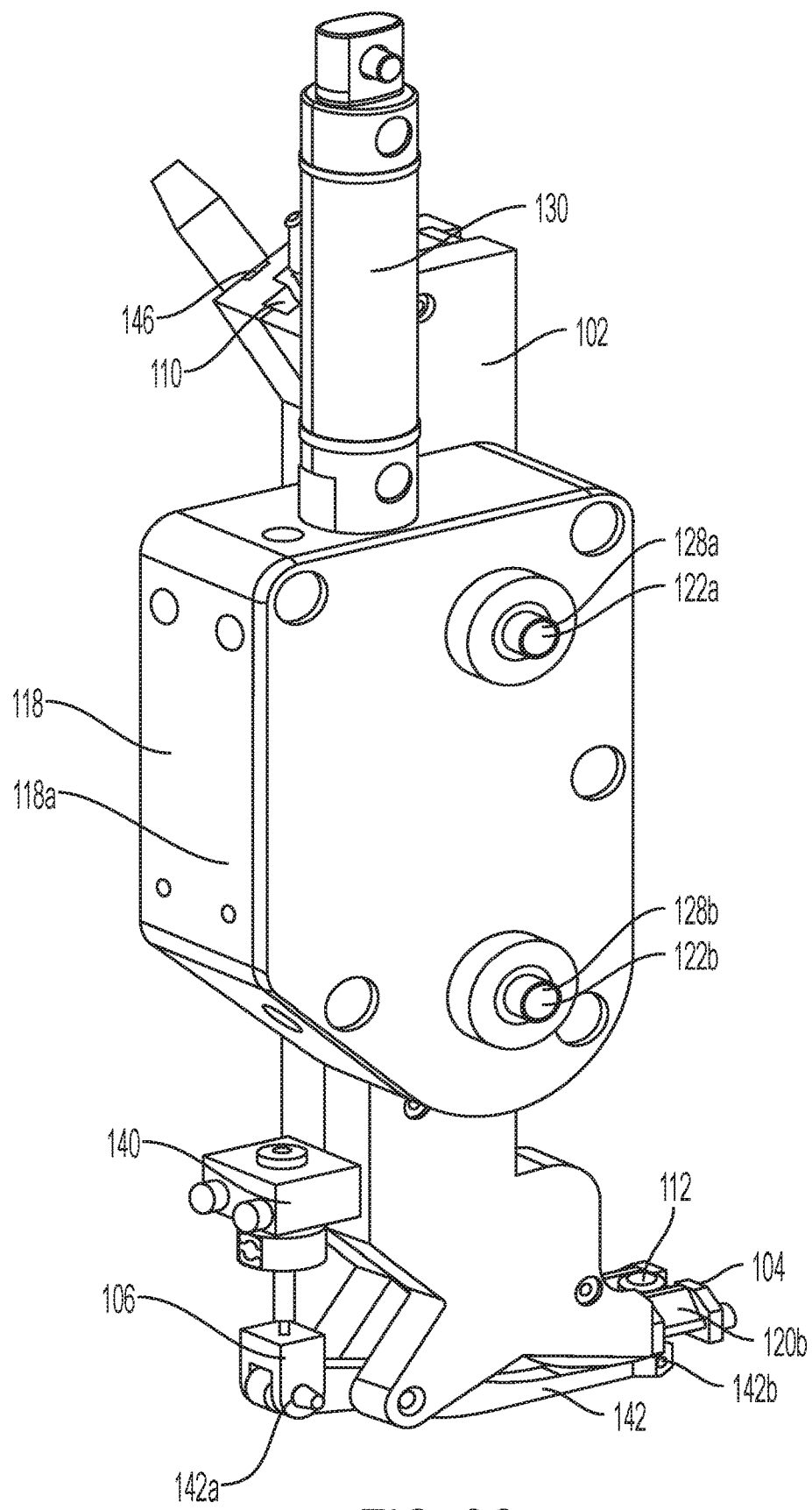
FIG. 2C is a right rear perspective view of the rivet dispenser system of FIG. 2A.

The rivet dispenser system 100 can be configured to move the rivet receiving member 102 in a single plane. For example, as illustrated in FIGS. 2A-D, the system 100 can comprise a drive unit 118. The drive unit 118 can be configured to move the rivet receiving member 102 along a path between a first position, as shown in FIG. 2A, and a second position, as shown in FIG. 2B. In various non-limiting embodiments, the rivet receiving member 102 can traverse an arc, e.g., a constant arc, as it moves between the first position and the second position. The drive unit 118 can comprise a first linkage 122a and a second linkage 122b. The first linkage 122a can comprise a pin 124a, a link member 126a, and a pin 128a. The pin 124a can be fixed with respect to the link member 126a and rotatable with respect to a body 118a of the drive unit 118. The pin 126a can be rotatable with respect to the link member 126a and the rivet receiving member 102. Rotating the pin 124a can thereby rotate the link member 126a. The second linkage 122b can comprise a pin 124b, a link member 126b, and a pin 128b. The pin 124b can be fixed with respect to the link member 126b and rotatable with respect to the body 118a. The pin 128b can be rotatable with respect to the link member 126b and the rivet receiving member 102. Rotating the pin 124b can thereby rotate the link member 126b. Rotating the link members 126a and 126b can move the rivet receiving member 102 in a single plane along a path between the first position, as shown in FIG. 2A, and the second position, as shown in FIG. 2B. In various embodiments, the linkages 122a and 122b can comprise angled bars and/or parallel arms.

Figure 2D:
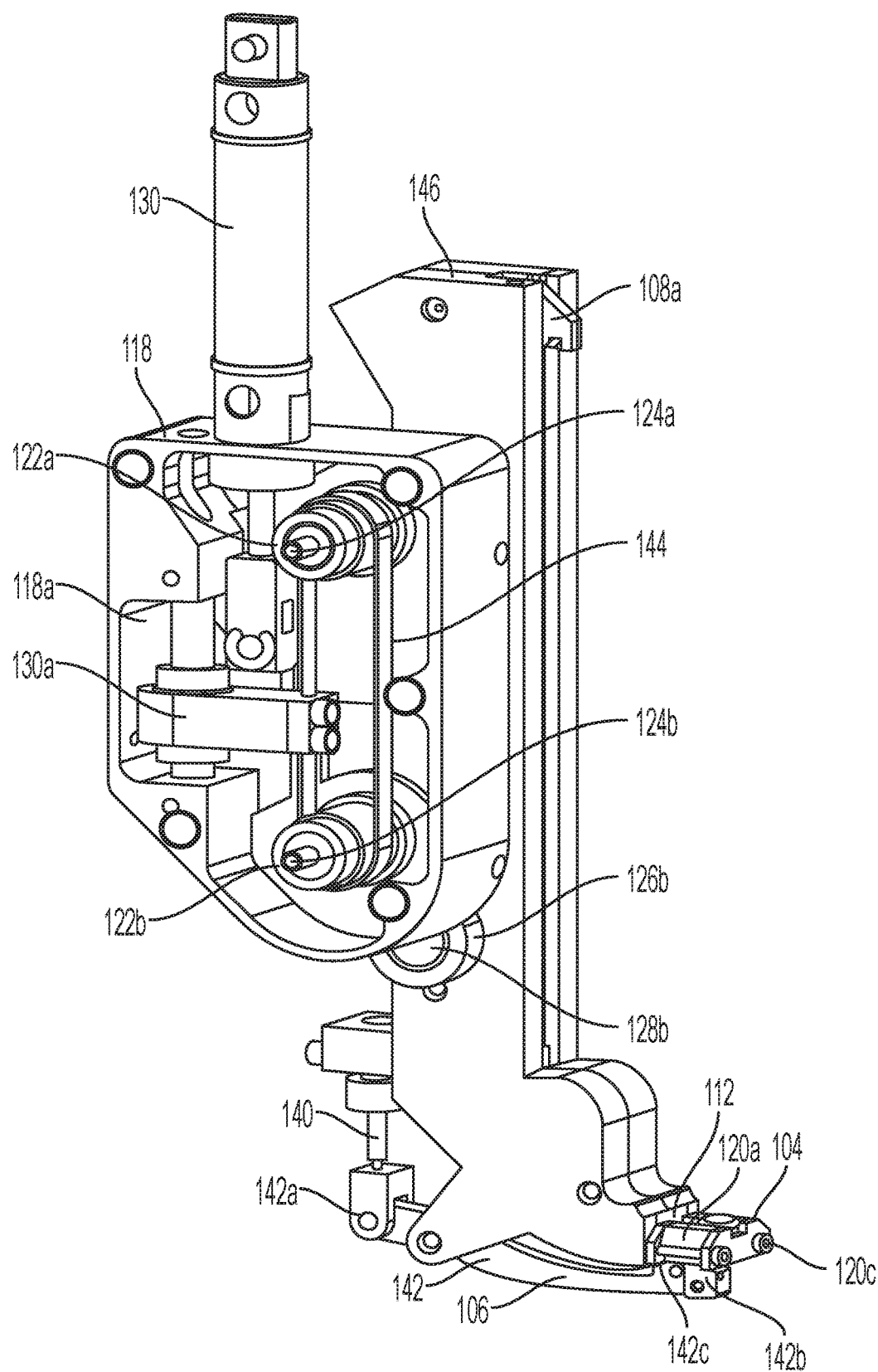
FIG. 2D is a right front perspective view of the rivet dispenser system of FIG. 2A shown with a cover removed from a drive unit of the system.

As illustrated in FIG. 2D, pins 124a and 124b can be rotated simultaneously by a belt 144. The belt 144 can be in communication with both of the pins 124a and 124b. Rotation of the belt 144 can rotate the pins 124a and 124b and thereby move the linkages 122a and 122b which can move the rivet receiving member 102 in an arcuate path. The belt 144 can synchronize movement of the linkages 122a and 122b such that the rivet dispensing apparatus 100 can be substantially parallel to the throat of a resistance spot rivet welding apparatus. The belt 144 can comprise teeth and the pins 124a and 124b can each comprise a gear which can inhibit unsynchronized movement.

A linear actuation member 130 can move the belt 128 that rotates the pins 124a and 124b. In various non-limiting embodiments, the linear actuation member 130 comprises at least one of an actuator and a piston. In various embodiments, the linear actuation member 130 is pneumatically powered. For example, the linear actuation member 130 can be connected to the belt 128 via a joint 130a. When the linear actuation member 130 moves linearly back and forth, the belt 128 also moves back and forth, rotating the pins 124a and 124b in one rotational direction and then in the other. The cyclical rotation of pins 124a and 124b causes the rivet receiving member 102 to sweep through an arcuate path relative to the drive unit 118 in one direction and then in an opposite direction.

Figure 3A:
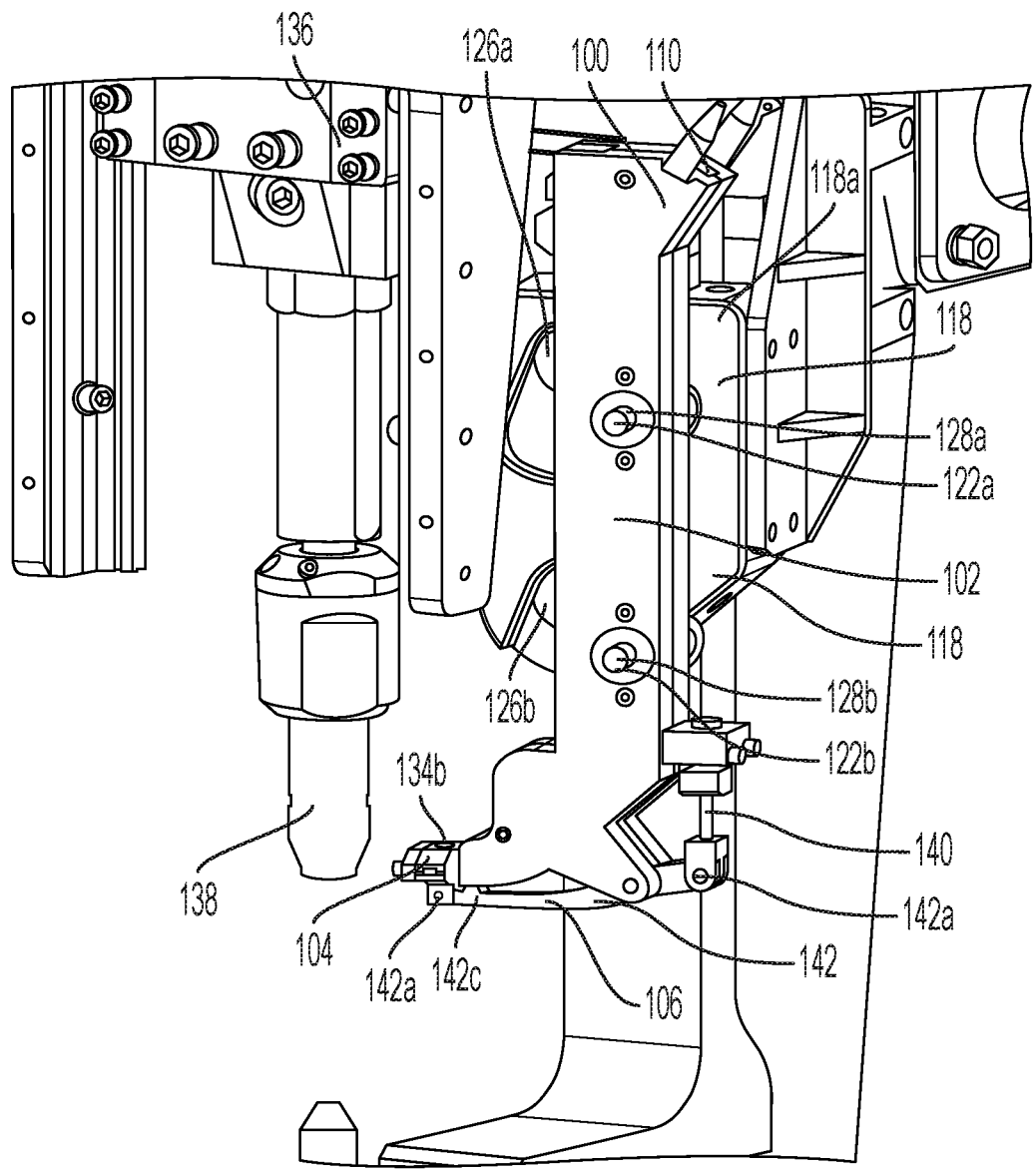
FIG. 3A is a perspective view of a non-limiting embodiment of a resistance spot rivet welding apparatus comprising a non-limiting embodiment of a rivet dispenser system according to the present disclosure shown in a first configuration.
Figure 3B:
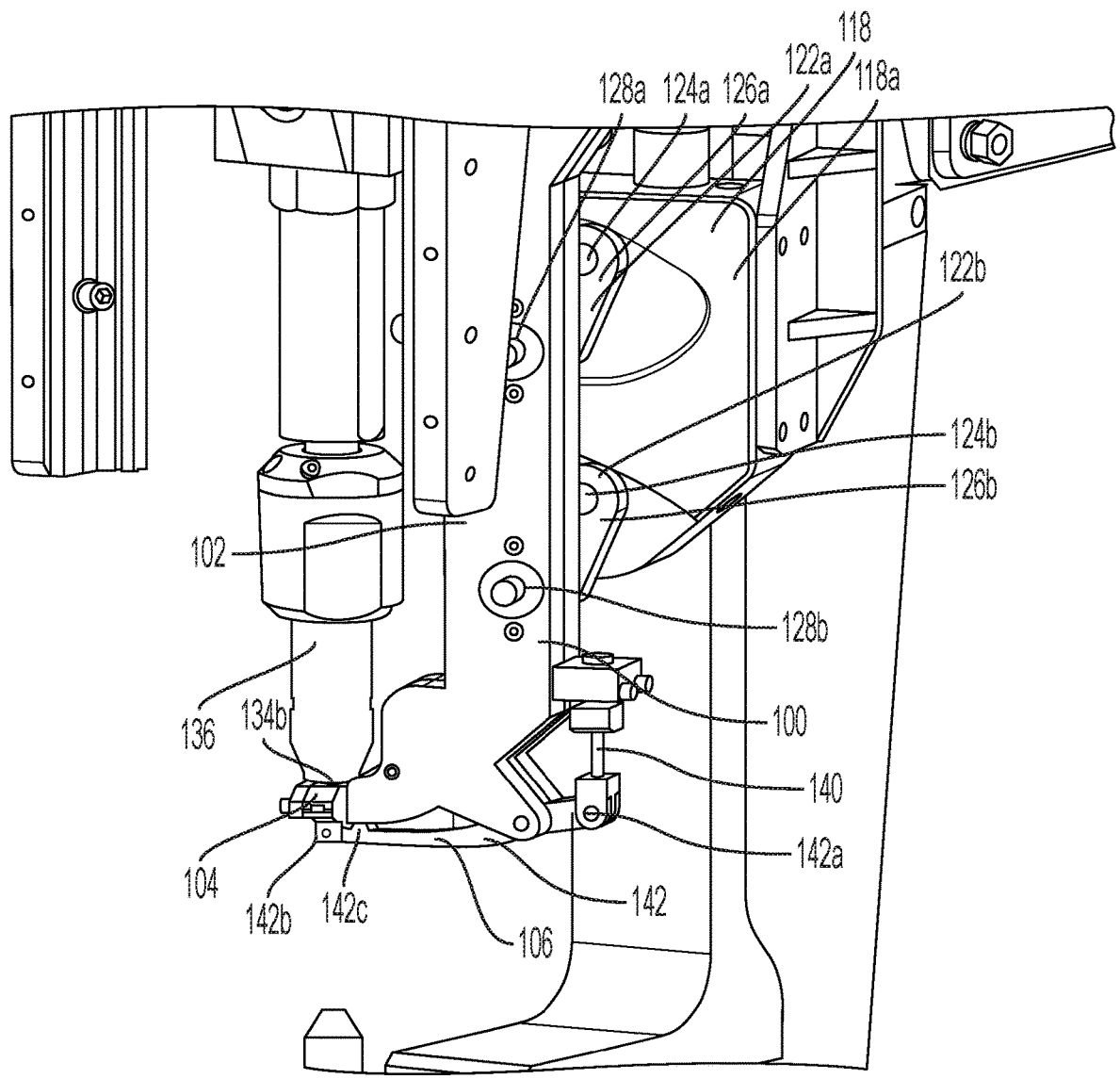
FIG. 3B is a perspective view of the resistance spot rivet welding apparatus of FIG. 3A wherein the rivet dispenser system is shown in a second configuration.

As illustrated in FIGS. 3A-B, a resistance spot rivet welding apparatus 136 can comprise a rivet holder 138 and the rivet dispenser system 100. The rivet dispenser system 100 can move in a multi-step path to avoid a throat of the resistance spot rivet welding apparatus 136 and increase part clearance. For example, FIG. 3A illustrates the rivet dispenser system 100 in a first configuration in which the rivet receiving member 102 is positioned away from the rivet holder 138 such that the rivet holder 138 can engage and weld a part. The drive unit 118 subsequently can move the rivet receiving member 102 of the rivet dispenser system 100 to a second configuration as illustrated in FIG. 3B in which the rivet receiving member 102 is positioned to present the rivet 134b disposed on the seat member 104 to the rivet holder 138. In various non-limiting embodiments, the rivet holder 138 and the rivet dispenser system 100 can be components of a pedestal spot rivet welding apparatus. In various non-limiting embodiments, the rivet holder 138 and the rivet dispenser system 100 can be components of a robotic spot rivet welding apparatus.

Figure 4A:
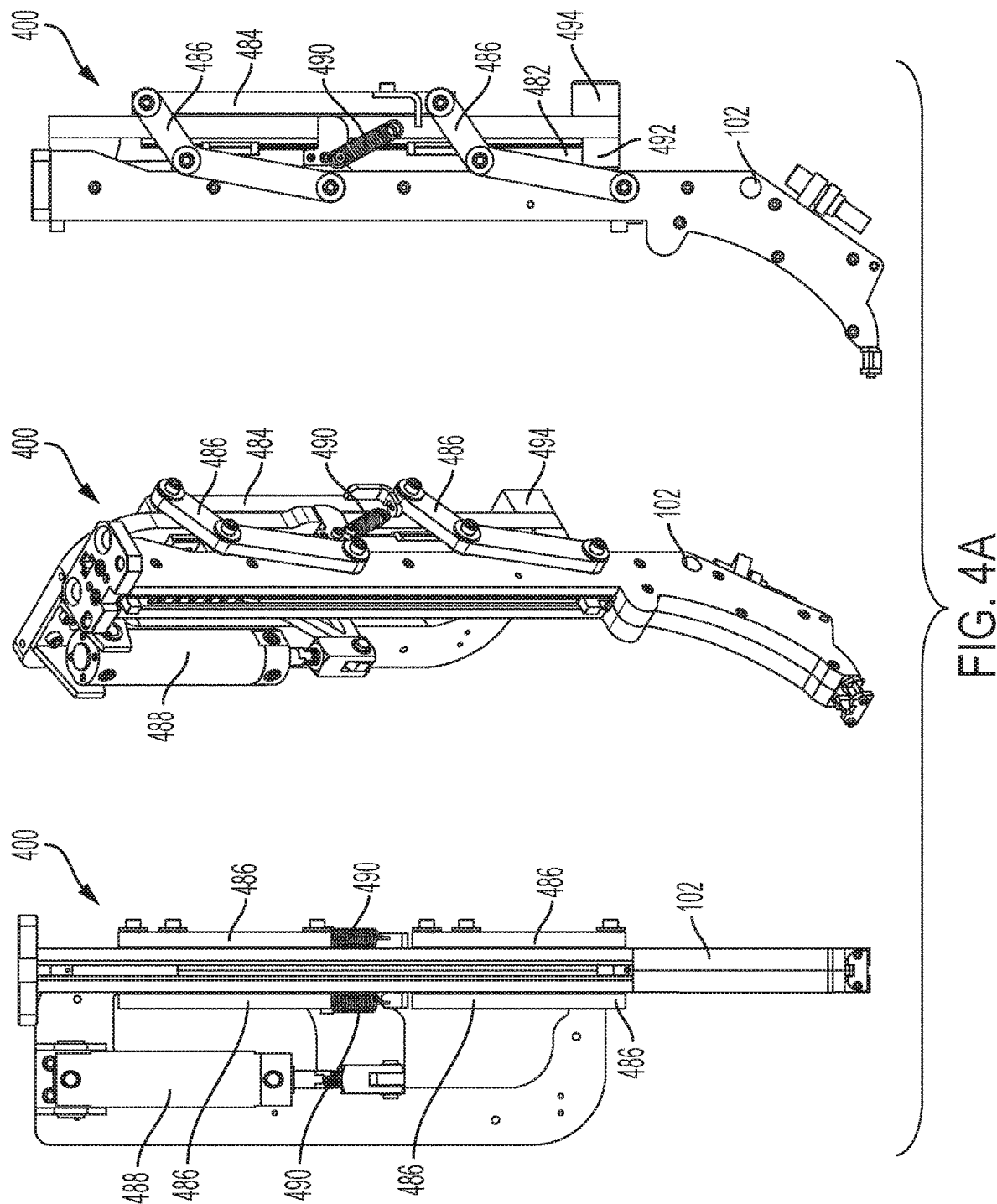
FIG. 4A includes a front elevational view, a front perspective view, and a side elevational view of a non-limiting embodiment of a rivet dispenser system according to the present disclosure comprising substantially parallel bar linkages shown in a resting position.
Figure 4B:
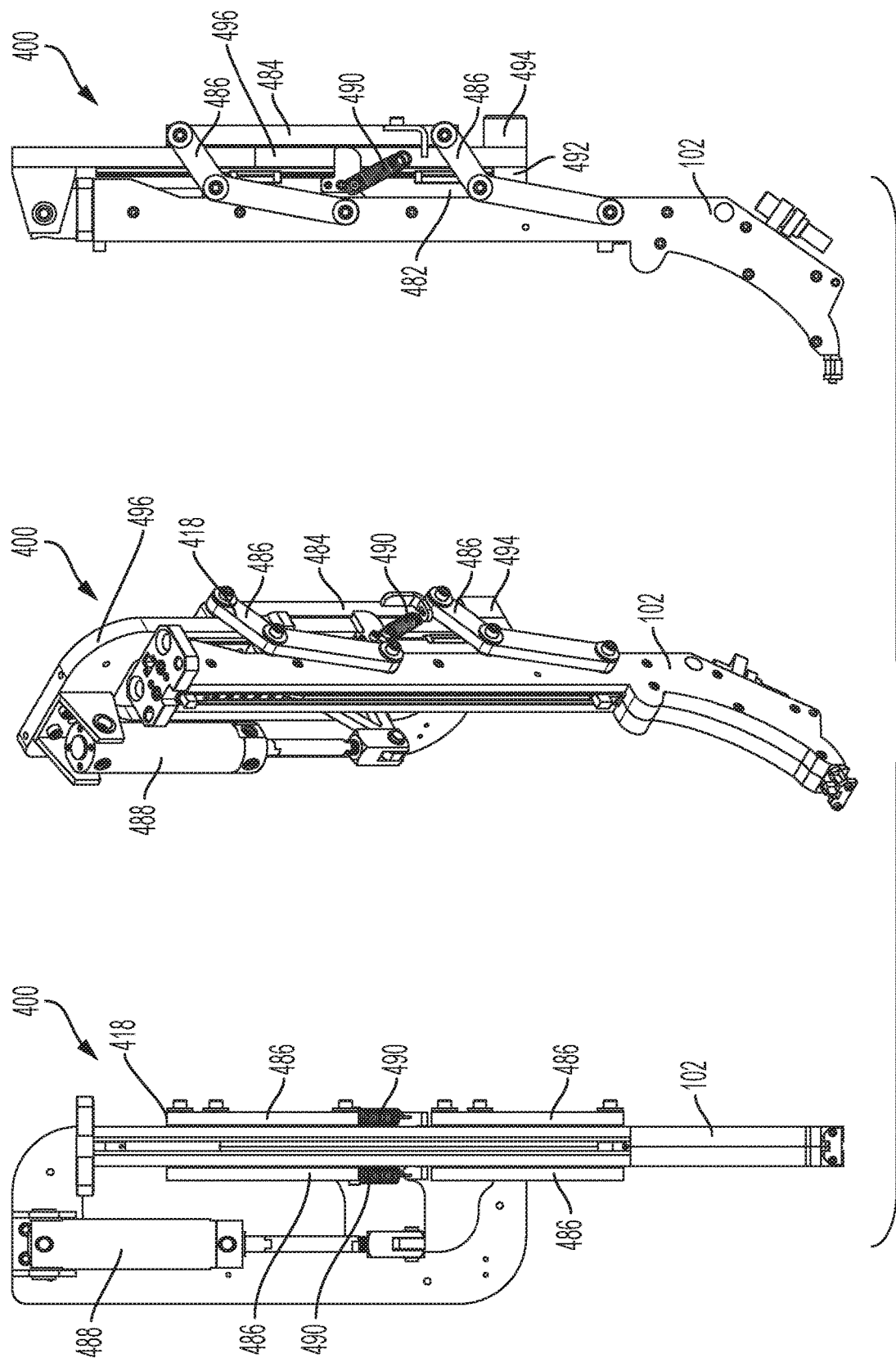
FIG. 4B includes a front elevational view, a front perspective view, and a side elevational view of the rivet dispenser system of FIG. 4A shown in a first position.
Figure 4C:
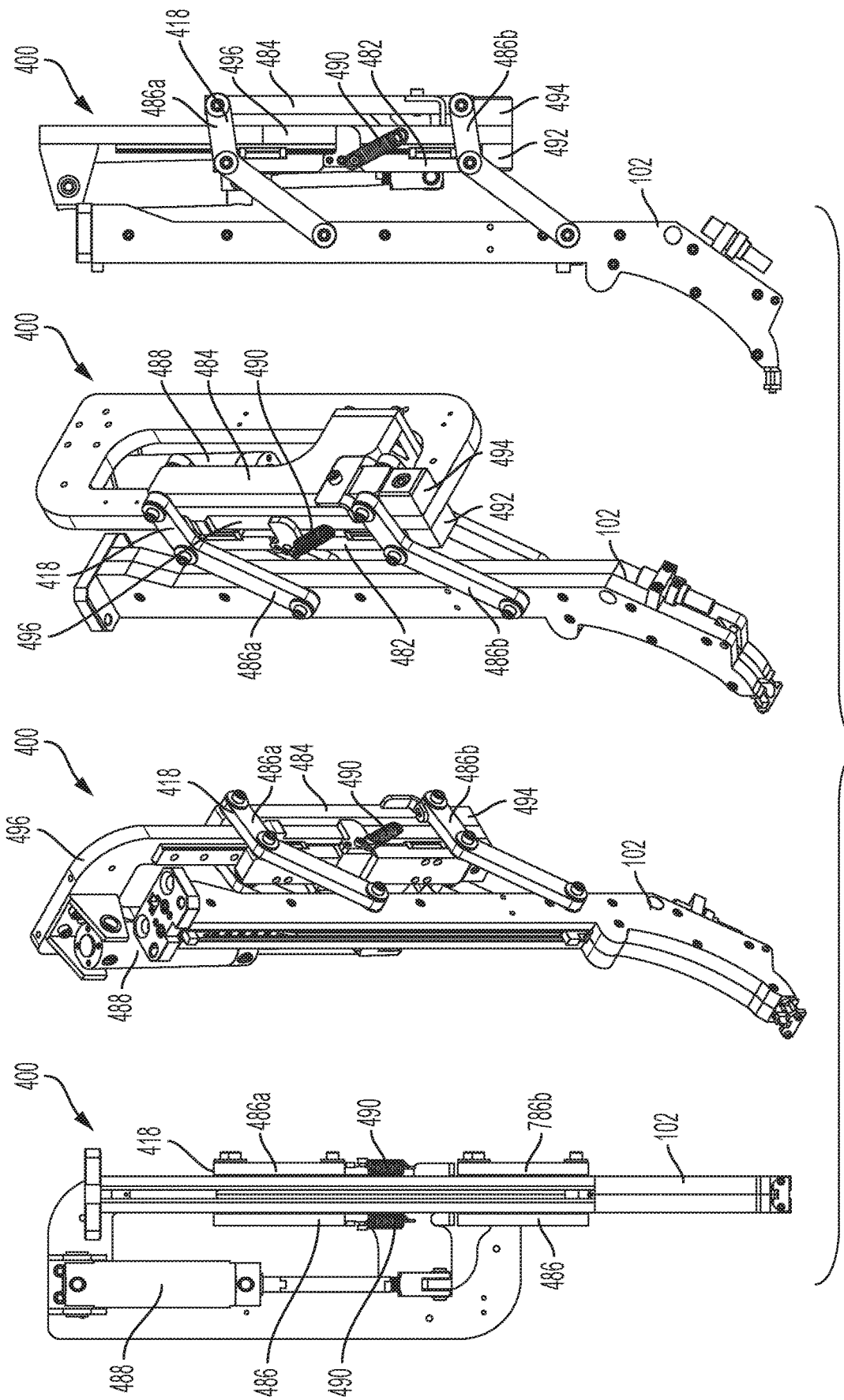
FIG. 4C includes a front elevational view, a front perspective view, a rear perspective view, and a side elevational view of the rivet dispenser system of FIG. 4A shown in a second position.
Figure 5A:
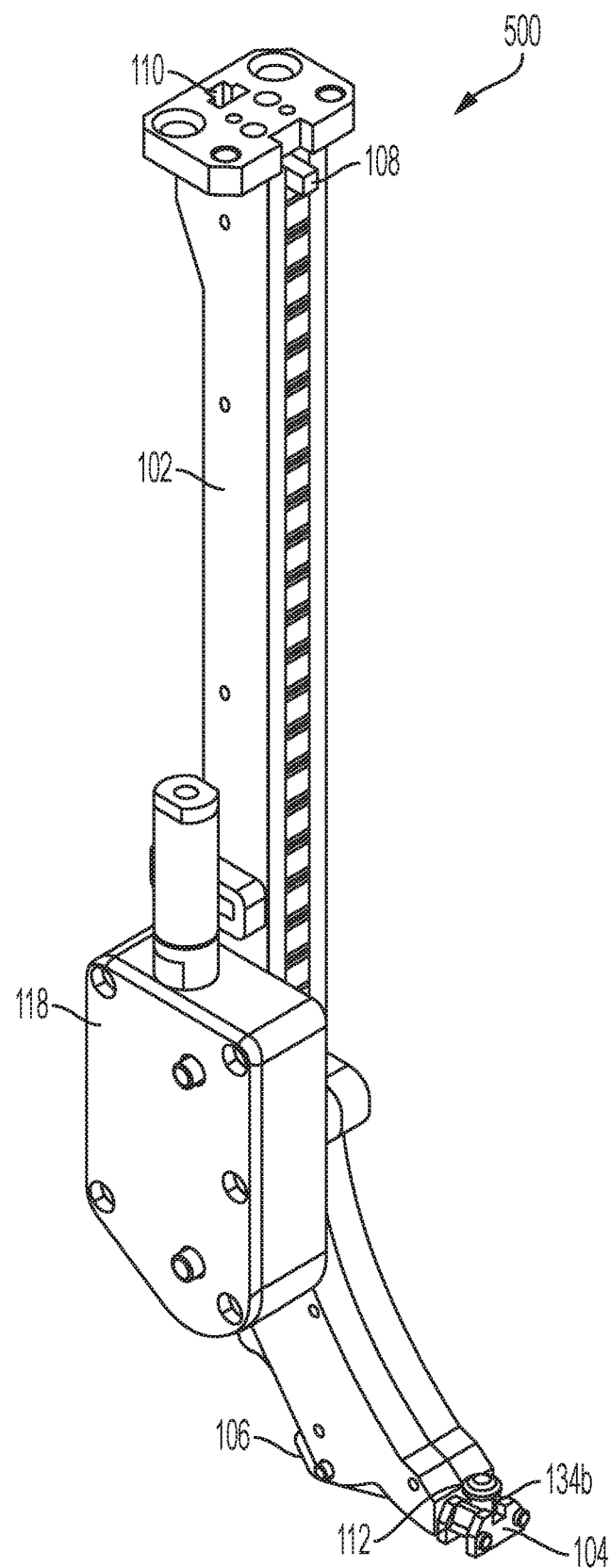
FIG. 5A is a right front perspective view of a non-limiting embodiment of a rivet dispenser system according to the present disclosure.
Figure 5B:
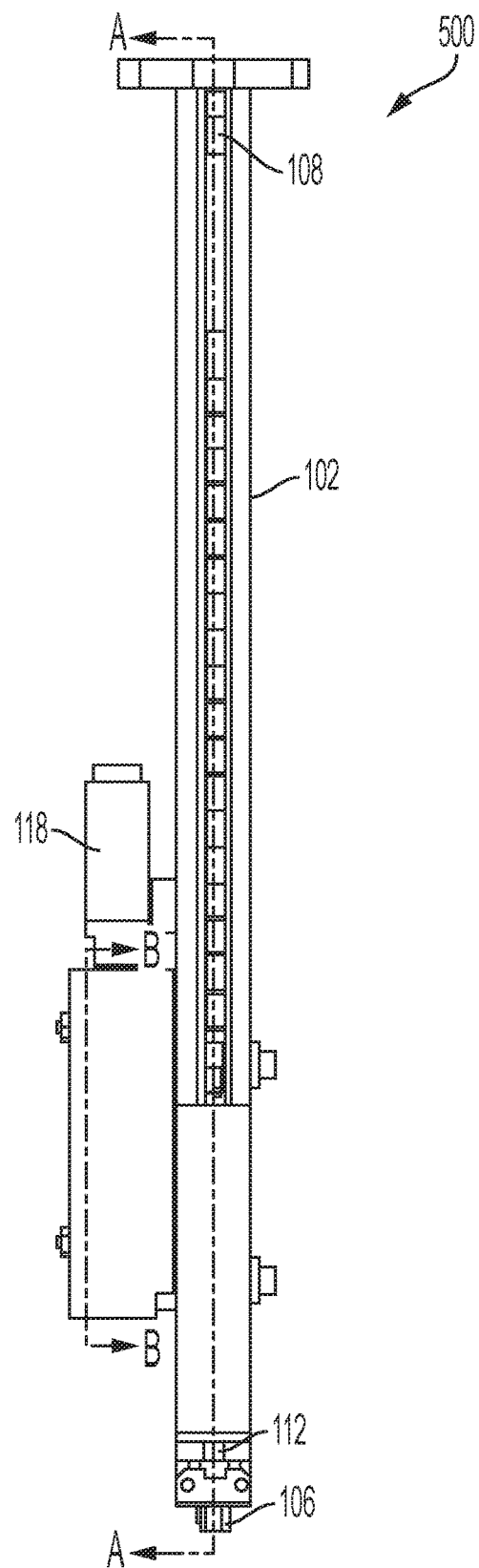
FIG. 5B is a front elevational view of the rivet dispenser system of FIG. 5A.
Figure 5C:
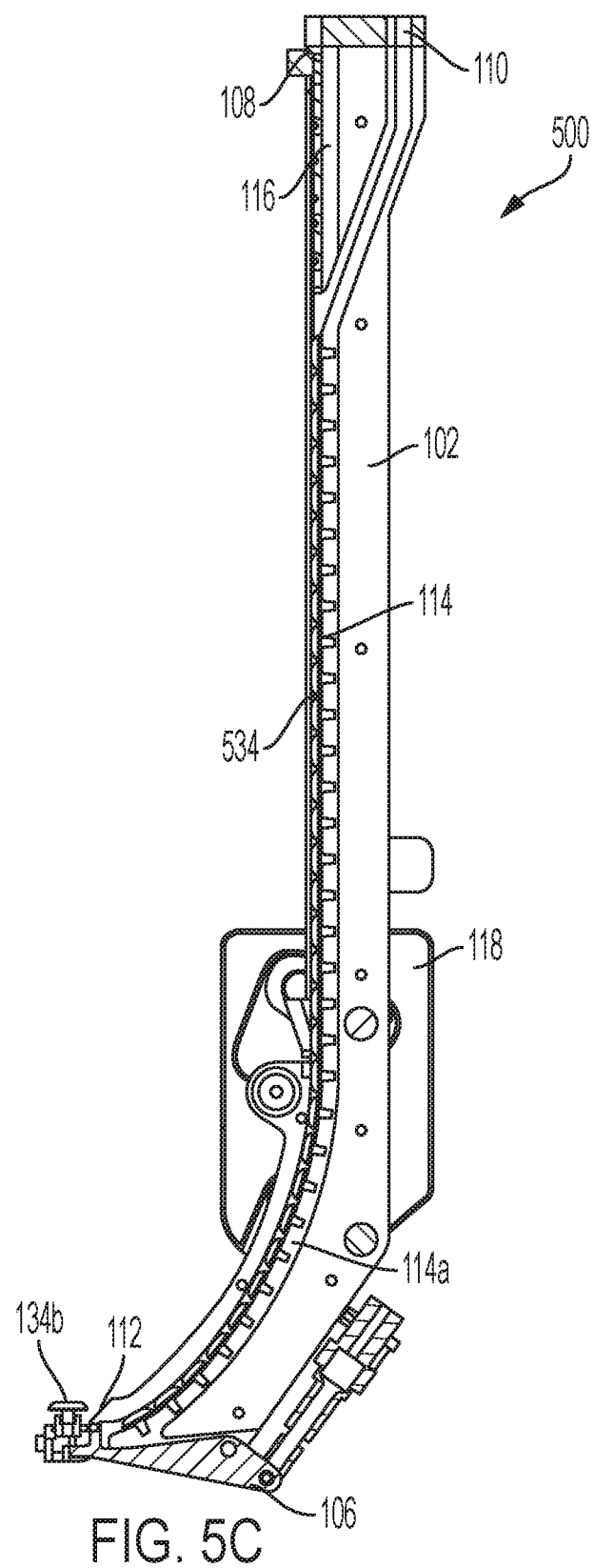
FIG. 5C is a left side cross-sectional elevational view of the rivet dispenser system of FIG. 5A taken along A-A in FIG. 5B.
Figure 5D:
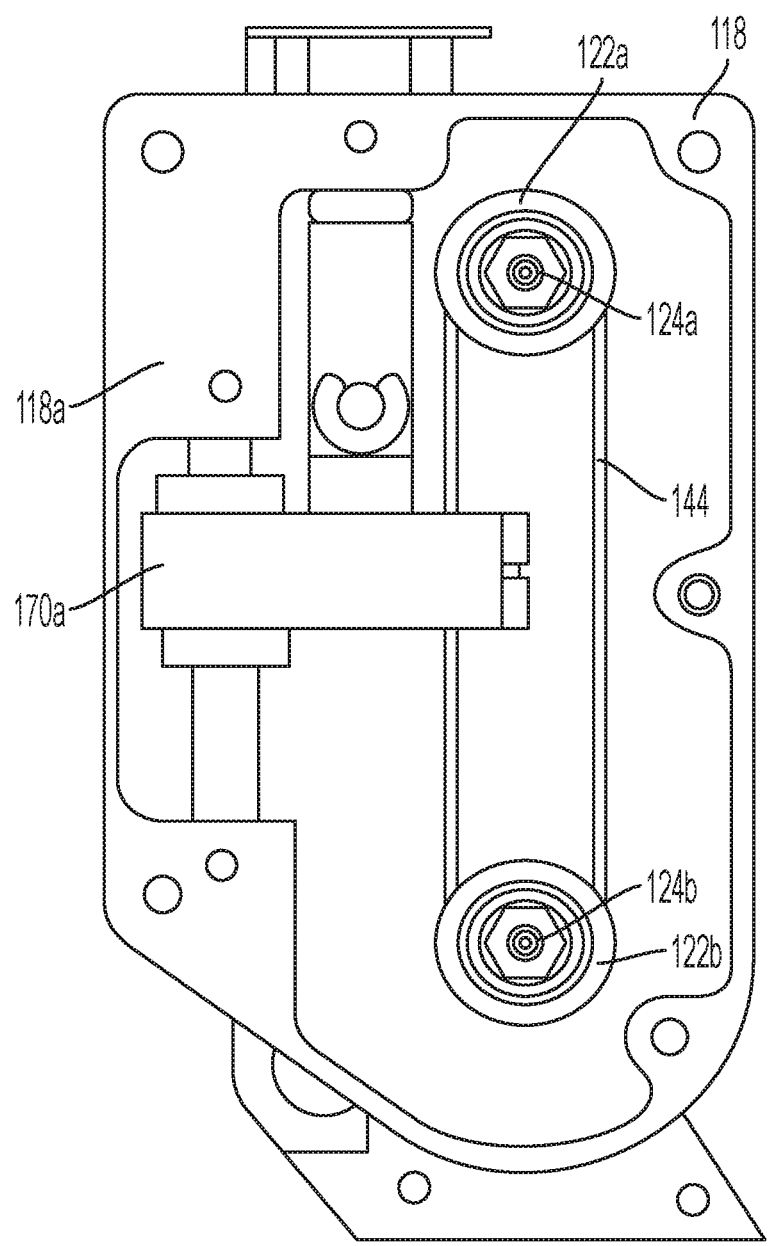
FIG. 5D is an elevational cross-sectional view of the drive unit of the rivet dispenser system of FIG. 5A taken along B-B in FIG. 5B.
Figure 5E:
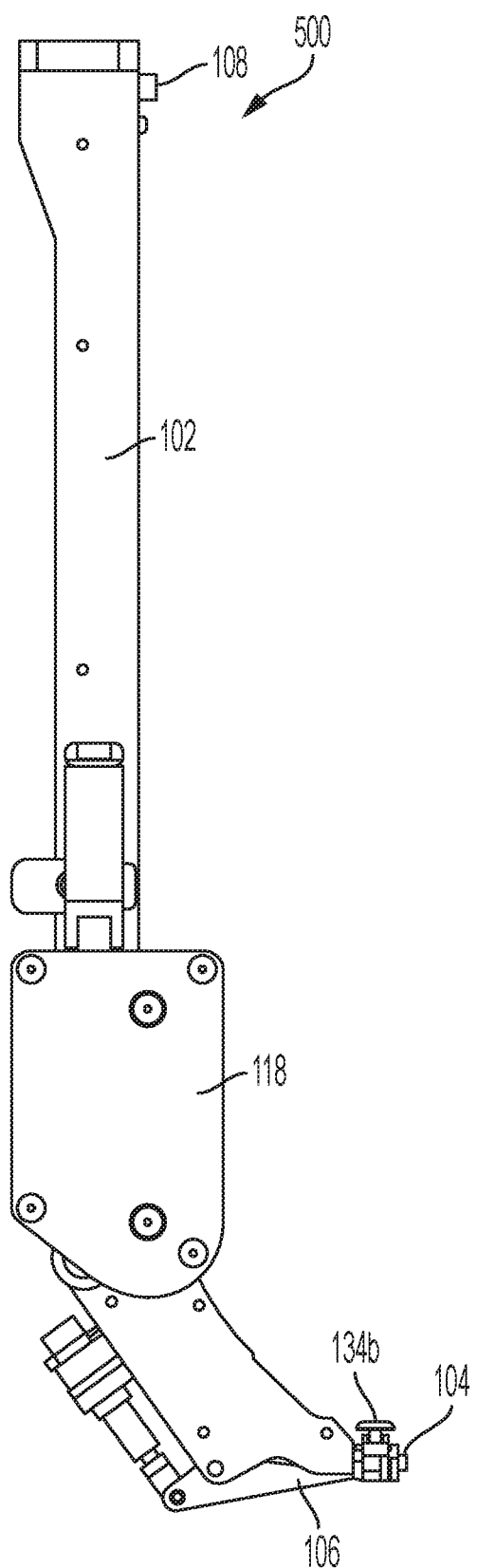
FIG. 5E is a right side elevational view of the rivet dispenser system of FIG. 5A.
Figure 5F:
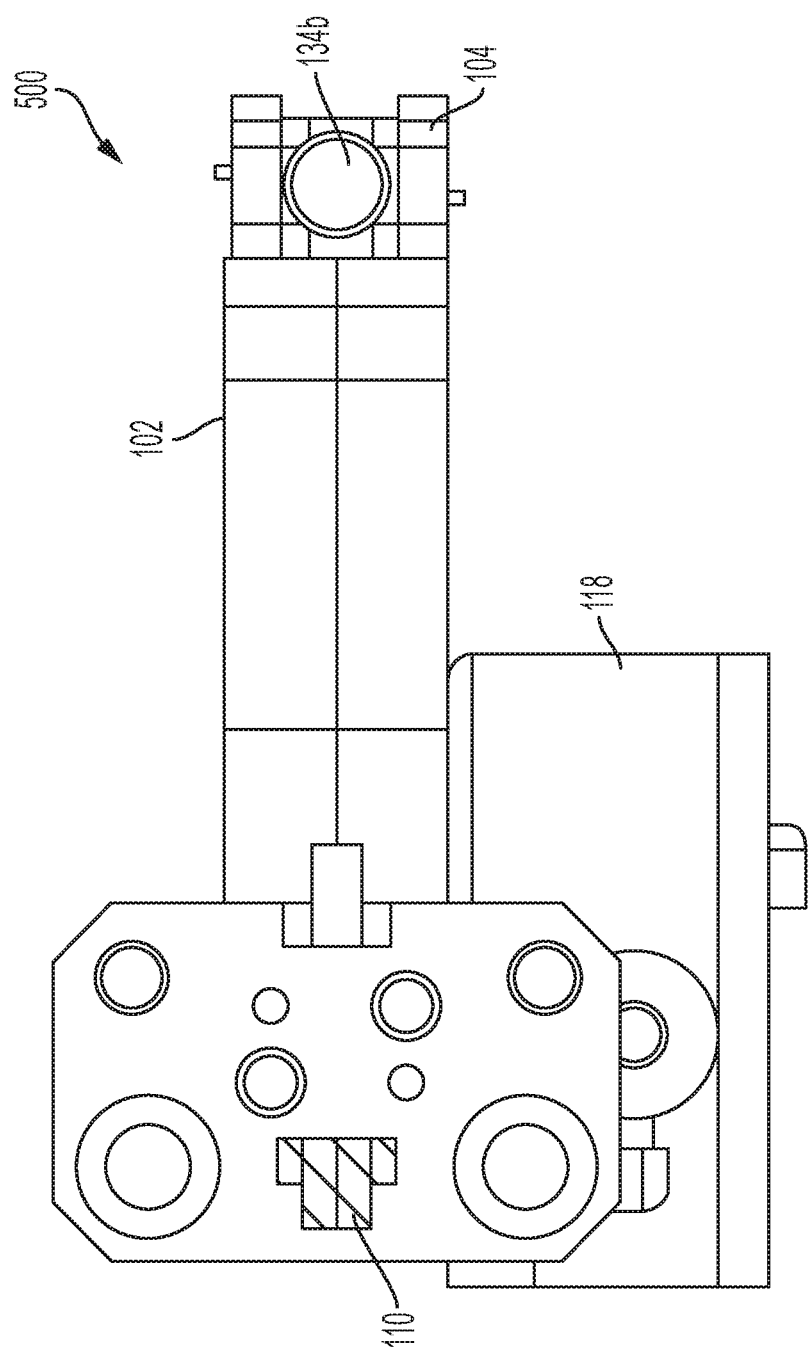
FIG. 5F is a top view of the rivet dispenser system of FIG. 5A.

In various non-limiting embodiments, a linkage, gear, carriage, and/or link can be used in place of or in combination with the belt 144 of a drive unit adapted to move the rivet receiving member 102. For example, as illustrated in FIGS. 4A-C, a drive unit 418 of a rivet dispenser system according to the present disclosure can comprise a main carriage 482, a secondary carriage 484, a mounting base 496, a bar linkage 486, an actuator 488, and one or more springs 490. In various non-limiting embodiments, only a single spring 490 may be present.

The bar linkage 486 can comprise a first linkage 486a and a second linkage 486b. Each linkage 486a and 486b can be pivotally coupled to the rivet receiving member 102. The main carriage 482 can be pivotally coupled to the first linkage 486a, the second linkage 486b, the mounting base 496, and the springs 490. The secondary carriage 484 can be pivotally coupled to the first linkage 486a, the second linkage 486b, the mounting base 496, and the actuator 488. The mounting base 492 can be pivotally coupled to the actuator 488. The main carriage 482 and the secondary carriage 484 can move independently of the mounting base 492. The springs 490 can be pivotally coupled to the main carriage 482 and the secondary carriage 484.

The configuration of the drive unit 418 can maintain the first linkage 486a in a substantially parallel orientation with respect to the second linkage 486b while moving the rivet receiving member 102 of the rivet dispenser system 400. For example, FIG. 4A includes front elevational, perspective, and side views illustrating a resting position of the rivet dispenser system 400. The drive unit 418 can move the rivet receiving member 102 of the rivet dispenser system 400 in a path to avoid a throat (e.g., a rivet holder) of a resistance spot rivet welding apparatus and increase part clearance. The path can be an arc, such as, for example, a constant arc.

In order to move the rivet receiving member 102 of the rivet dispenser system 400, the actuator 488 of the drive unit 418 can apply a force to the secondary carriage 484 to urge the secondary carriage 484 toward a secondary stop 494 of the drive unit 418. For example, the force can be applied to the secondary carriage 484 by extending a piston of the drive unit 418. Due to the coupling of the main carriage 482 to the first and second linkages 486a and 486b and the springs 490, the movement of the secondary carriage 482 can urge the main carriage 482 towards the main stop 492. The movement of the carriages, 482 and 484, can move the first and second linkages, 486a and 486b, while maintaining the orientation of the first and second linkages, 486a and 486b, substantially parallel to one another, thereby moving the rivet receiving member 102 of the rivet dispenser system 400 generally linearly toward a throat of the resistance spot rivet welding apparatus (e.g., rivet holder 138 as illustrated in FIG. 3B) to a first position as illustrated in FIG. 4B. In various non-limiting embodiments, during the movement from the resting position to the first position, the main carriage 482 and the secondary carriage 484 move substantially the same distance.

Once at the first position in FIG. 4B, the main carriage 482 can contact the main stop 492, which can stop the movement of the main carriage 482. The actuator 488 can continue to apply a force to the secondary carriage 484 to overcome tension created by the springs 490 between the main carriage 482 and the secondary carriage 484, thereby moving the secondary carriage 484 independently of the main carriage 482. The independent movement of the secondary carriage 484 can actuate the bar linkages 486a and 486b to move toward a second position as illustrated in FIG. 4C. In various non-limiting embodiments, during movement from the first position to the second position, the main carriage 482 can be generally stationary and the secondary carriage 484 can move a desired distance.

Once at the second position as illustrated in FIG. 4C, the secondary carriage 484 can contact a secondary stop 494 to retain the rivet receiving member 102 of the rivet dispenser system 400 in a position for providing a rivet to a rivet holder (e.g., rivet holder 138 as illustrated in FIG. 3A-B).

The actuator 488 can move the second linkage 486b away from the secondary stop 494 (e.g., remove the applied force, retract the piston), thereby moving the rivet receiving member 102 of the rivet dispenser apparatus 400 from the second position illustrated in FIG. 4C to the first position illustrated in FIG. 4B. Thereafter, the actuator 488 can continue to move the secondary carriage 484 away from the secondary stop 494, thereby moving the rivet receiving apparatus 102 of the rivet dispenser apparatus 400 from the first position illustrated in FIG. 4B to the resting position illustrated in FIG. 4A.

Referring again to FIGS. 1A-1D, the rivet dispenser system 100 can comprise a rivet sensor configured to detect the number of rivets within the channel 114. For example, the rivet sensor can comprise a laser distance sensor or a linear displacement transducer. The rivet sensor can be in communication with the rivet receiving member 102 to detect the position of the tensioner 108 and/or the position of rivets within the channel 114. The position of the tensioner 108 and/or the position of rivets within the channel 114 can be utilized to determine to the quantity of rivets within the channel 114. The quantity of rivets can be communicated to a rivet dispensing reloading system to prepare a desired quantity of rivets for a reloading into the rivet dispenser apparatus.

In various non-limiting embodiments, a resistance spot rivet welding apparatus can comprise at least two rivet dispenser systems 100. For example, as illustrated in FIGS. 8A-D, a resistance spot rivet welding apparatus 836, including a rivet holder 838, can comprise two rivet dispenser systems 800a and 800b. The design of the rivet dispenser systems 800a and 800b can be the same or different. The rivet dispenser systems 800a and 800b can be adapted to dispense the same type of rivets or different types of rivets. In various non-limiting embodiments, the rivet dispensing systems 800a and 800b can be mounted at various positions and/or orientations with respect to the rivet holder 836 of the resistance spot rivet welding apparatus 836.

The present disclosure provides a method for dispensing a rivet so that the rivet can be accessed by a rivet holder of a resistance spot rivet welding apparatus and/or a pedestal welder. The method can comprise receiving the rivet in a channel of a rivet dispensing system and storing the rivet on a seat member of the rivet dispenser system. The rivet dispenser system can be moved along a path to align the seat member with the rivet holder. In various non-limiting embodiments, the path is arc shaped, such as, for example, constant arc shaped. The rivet positioned on the seat member can be accessed/engaged by the rivet holder.

In various non-limiting embodiments, during the movement of the rivet dispensing system, the rivet can be held on the seat member with jaws of the rivet dispensing system. In certain non-limiting embodiments, a tensioner of the rivet dispensing system can be moved to a rivet reload position suitable to enable rivets to be introduced to the channel. In various non-limiting embodiments, a quantity of rivets within the channel of a rivet receiving member can be determined and communicated to a rivet dispenser reloading system.

Various aspects of the invention according to the present disclosure include, but are not limited to, the aspects listed in the following numbered clauses.

1. A rivet dispenser system comprising:
   a rivet receiving member defining a channel therein, wherein the channel includes a curved region, the rivet receiving member comprising a first port communicating with the channel and configured to receive rivets;
a second port communicating with the channel and configured to dispense rivets;
wherein the channel extends between the first port and the second port and is configured to transport rivets from the first port to the second port in a series arrangement and in a preselected orientation; and
a seat member communicating with the second port and configured to selectively engage with a rivet holder of a resistance spot rivet welding apparatus and introduce a single rivet to the rivet holder at one time.

2. The rivet dispenser system of clause 1, further comprising an actuation member configured to move a rivet independently of the seat member.

3. The rivet dispenser system of clause 2, wherein the actuation member comprises a lever and at least one of an actuator and a piston in communication with the lever.

4. The rivet dispenser system of clause 3, wherein the lever comprises a protrusion configured to inhibit additional rivets from advancing from the second port onto the seat member.

5. The rivet dispenser system of any one of clauses 1-4, further comprising a tensioner configured to urge the rivets towards the seat member.

6. The rivet dispenser system of clause 5, wherein the tensioner further comprises a finger configured to extend into the channel and retract from the channel.

7. The rivet dispenser system of any one of clauses 5-6, further comprising a secondary channel in communication with the channel, wherein the tensioner is configured to move into the secondary channel to enable rivets to be received by the channel.

8. The rivet dispenser system of any one of clause 5-7, wherein the tensioner comprises a protrusion suitable to engage a rivet dispenser reloading system to move the tensioner within the channel.

9. The rivet dispenser system of any one of clauses 1-8, further comprising a drive unit comprising a first linkage and a second linkage, each linkage pivotally coupled to the rivet receiving member, the drive unit configured to move the rivet receiving member along a path to traverse between a first position and a second position.

10. The rivet dispenser system of clause 9, wherein the path is arc shaped.

11. The rivet dispenser system of any one of clauses 9-10, wherein the drive unit comprises:
a bar linkage comprising the first linkage and the second linkage;
a main carriage connecting the first linkage and the second linkage;
a secondary carriage connecting the first linkage and the second linkage; and
an actuator configured to move at least one of the main carriage and the secondary carriage.

12. The rivet dispenser system of clause 11, further comprising a spring connected to the main carriage to urge the rivet receiving member into the first position.

13. The rivet dispenser system of any one of clauses 1-12, further comprising a rivet sensor configured to determine the quantity of rivets in the channel.

14. A resistance spot rivet welding apparatus comprising the rivet dispenser system of any one of clauses 1-13.

16. A method for dispensing a rivet onto a rivet holder of a resistance spot rivet welding apparatus, the method comprising:
receiving the rivet in a channel of a rivet dispenser system and storing the rivet on a seat member of the rivet dispenser system;
moving the rivet dispenser system along a path to align the seat member with the rivet holder; and
introducing the rivet stored on the seat member to the rivet holder.

17. The method of clause 16, further comprising holding the rivet on the seat member with jaws of the rivet dispenser system during moving the rivet dispenser system.

18. The method of any one of clauses 16-17, further comprising moving a tensioner of the rivet dispenser system to a rivet reload position suitable to allow rivets to be introduced to the channel.

19. The method of any one of clauses 16-18, wherein the path is an arc.

20. The method of any one of clauses 16-19, further comprising determining a quantity of rivets within the channel and communication the determined quantity to a rivet dispenser reloading system.

One skilled in the art will recognize that the herein described apparatus, systems, and methods, and the discussion accompanying them, are used as examples for the sake of conceptual clarity and that various configuration modifications are contemplated. Consequently, as used herein, the specific examples/embodiments set forth and the accompanying discussion are intended to be representative of their more general classes. In general, use of any specific exemplar is intended to be representative of its class, and the non-inclusion of specific components, devices, operations/ actions, and objects should not be taken to be limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:

1. A rivet dispenser system comprising:
a rivet receiving member defining a channel therein, wherein the channel includes a curved region, the rivet receiving member comprising
a first port communicating with the channel and configured to receive rivets; and
a second port communicating with the channel and configured to dispense rivets;
wherein the channel extends between the first port and the second port and is configured to transport rivets from the first port to the second port in a series arrangement and in a preselected orientation;
a seat member communicating with the second port and configured to selectively engage with a rivet holder of a resistance spot rivet welding apparatus and introduce a single rivet to the rivet holder at one time, wherein the seat member comprises jaws configured to forcibly contact the rivet and prevent the rivet from changing at least one of a position and an orientation with respect to the seat member; and
an actuation member configured to move a rivet independently of the seat member, wherein the actuation member comprises
a lever, and
at least one of an actuator and a piston in communication with the lever, wherein the at least one of the actuator and the piston is configured to apply a force to a first end of the lever to move a second end of the lever from a first position to a second position, such that the lever moves a rivet on the seat member to a secondary position above the seat member including the jaws.

2. The rivet dispenser system of claim 1, wherein the lever comprises a protrusion configured to inhibit additional rivets from advancing from the second port onto the seat member.

3. The rivet dispenser system of claim 1, further comprising a tensioner comprising a shape configured to move through at least a portion of the channel.

4. The rivet dispenser system of claim 3, wherein the tensioner further comprises a finger configured to extend into the channel and retract from the channel.

5. The rivet dispenser system of claim 3, further comprising a secondary channel in communication with the channel, wherein the tensioner is configured to move into the secondary channel to enable rivets to be received by the channel.

6. The rivet dispenser system of claim 3, wherein the tensioner comprises a protrusion suitable to engage a rivet dispenser reloading system to move the tensioner within the channel.

7. The rivet dispenser system of claim 1, further comprising a drive unit comprising a first linkage and a second linkage, each linkage pivotally coupled to the rivet receiving member, the drive unit configured to move the rivet receiving member along a path to traverse between a first position and a second position.

8. The rivet dispenser system of claim 7, wherein the path is arc shaped.

9. The rivet dispenser system of claim 7, wherein the drive unit comprises:
a bar linkage comprising the first linkage and the second linkage;
a main carriage connecting the first linkage and the second linkage;
a secondary carriage connecting the first linkage and the second linkage; and
an actuator configured to move at least one of the main carriage and the secondary carriage.

10. The rivet dispenser system of claim 9, further comprising a spring connected to the main carriage to urge the rivet receiving member into the first position.

11. The rivet dispenser system of claim 1, further comprising a rivet sensor configured to determine the quantity of rivets in the channel.

12. A resistance spot rivet welding apparatus comprising the rivet dispenser system of claim 1.

* * * * *